(12) United States Patent
Salim et al.

(10) Patent No.: US 8,006,904 B2
(45) Date of Patent: Aug. 30, 2011

(54) OPERATION MONITORING AND ENHANCED HOST COMMUNICATIONS IN SYSTEMS EMPLOYING ELECTRONIC ARTICLE SURVEILLANCE AND RFID TAGS

(75) Inventors: Mohamed A Salim, Eugene, OR (US);
Harold C. Clifford, Eugene, OR (US);
Alan Jackson Guess, Eugene, OR (US);
Bruce Edward Paris, Eugene, OR (US)

(73) Assignees: Datalogic Scanning, Inc., Eugene, OR (US); Sensormatic Electronics LLC, Boca Raton, FL (US)

( * ) Notice: Subject to any disclaimer, the term of this patent is extended or adjusted under 35 U.S.C. 154(b) by 0 days.

(21) Appl. No.: 12/435,989

(22) Filed: May 5, 2009

(65) Prior Publication Data
US 2010/0001863 A1 Jan. 7, 2010

Related U.S. Application Data

(60) Division of application No. 10/612,870, filed on Jul. 2, 2003, now Pat. No. 7,527,198, which is a continuation-in-part of application No. 10/390,542, filed on Mar. 14, 2003, now abandoned.

(60) Provisional application No. 60/365,432, filed on Mar. 18, 2002.

(51) Int. Cl.
| | |
|---|---|
| *G06F 19/00* | (2006.01) |
| *G06Q 30/00* | (2006.01) |
| *G06Q 90/00* | (2006.01) |
| *G06K 7/00* | (2006.01) |
| *G06K 7/08* | (2006.01) |
| *G06K 19/00* | (2006.01) |
| *G06K 19/06* | (2006.01) |
| *G08B 13/14* | (2006.01) |
| *G05B 19/00* | (2006.01) |

(52) U.S. Cl. ........ 235/385; 235/487; 235/492; 235/493; 235/435; 235/449; 235/451; 340/572.1; 340/5.92; 340/592.3

(58) Field of Classification Search .................. 235/487, 235/492, 493, 435, 449, 451, 375, 385, 462.01, 235/472.01; 340/572.1, 572.3, 4.34, 5.92
See application file for complete search history.

(56) References Cited

U.S. PATENT DOCUMENTS
3,624,631 A  11/1971  Chomet et al.
(Continued)

FOREIGN PATENT DOCUMENTS
EP  0 329 402 B1  12/1994
(Continued)

OTHER PUBLICATIONS
Brochure: Mettler Toledo 8217AS Adaptive Scale (1996).
(Continued)

*Primary Examiner* — Daniel Walsh
(74) *Attorney, Agent, or Firm* — Stoel Rives LLP

(57) ABSTRACT

A system and method for monitoring operation and performance of electronic tags such as article surveillance (EAS) tags or radio frequency identification (RFID) tags such as by monitoring and reporting electronic tag readability and operator/system performance levels. The system includes an optical symbol reader and/or electronic tag sensor/deactivator that measures and reports values of reading, detection, or deactivation events during operation which may be indicative of electronic tag operability. The apparatus may further comprise a data accumulation device including memory storage to accumulate the measurement values for each set of electronic tags, and a programmed computing system to analyze the measured values and report on the results of the analysis.

26 Claims, 12 Drawing Sheets

U.S. PATENT DOCUMENTS

| | | | |
|---|---|---|---|
| 4,141,078 A | 2/1979 | Bridges, Jr. et al. | |
| 4,575,624 A | 3/1986 | Klinkhardt | |
| 4,652,863 A | 3/1987 | Hultman | |
| 4,745,401 A | 5/1988 | Montean | |
| 4,752,758 A | 6/1988 | Heltemes | |
| 4,960,651 A | 10/1990 | Pettigrew et al. | |
| 5,059,951 A | 10/1991 | Kaltner | |
| 5,103,235 A | 4/1992 | Clemens | |
| 5,142,292 A | 8/1992 | Chang | |
| 5,210,524 A | 5/1993 | Schwarz et al. | |
| 5,225,807 A | 7/1993 | Zhou et al. | |
| 5,341,125 A | 8/1994 | Plonsky et al. | |
| 5,376,923 A | 12/1994 | Kindschy | |
| 5,377,269 A | 12/1994 | Heptig et al. | |
| 5,587,703 A | 12/1996 | Dumont | |
| 5,635,906 A | 6/1997 | Joseph | |
| 5,737,241 A | 4/1998 | Accolla et al. | |
| 5,814,799 A | 9/1998 | Swartz et al. | |
| 5,834,708 A | 11/1998 | Svetal | |
| 5,837,988 A | 11/1998 | Bobba et al. | |
| 5,841,348 A | 11/1998 | Herzer | |
| 5,886,336 A | 3/1999 | Tang et al. | |
| 5,917,412 A | 6/1999 | Martin | |
| 5,939,984 A | 8/1999 | Brady et al. | |
| 5,955,951 A | 9/1999 | Wischerop et al. | |
| 5,963,134 A | 10/1999 | Bowers et al. | |
| 5,978,772 A | 11/1999 | Mold | |
| 5,990,794 A | 11/1999 | Alicot et al. | |
| 6,025,780 A * | 2/2000 | Bowers et al. | 340/572.3 |
| 6,102,290 A | 8/2000 | Swartz et al. | |
| 6,111,507 A | 8/2000 | Alicot et al. | |
| 6,114,961 A | 9/2000 | Denholm et al. | |
| 6,121,878 A | 9/2000 | Brady et al. | |
| 6,154,135 A | 11/2000 | Kane et al. | |
| 6,154,137 A | 11/2000 | Goff et al. | |
| 6,169,483 B1 | 1/2001 | Ghaffari et al. | |
| 6,206,285 B1 | 3/2001 | Baitz et al. | |
| 6,208,235 B1 | 3/2001 | Trontelj | |
| 6,213,395 B1 | 4/2001 | Dejaeger et al. | |
| 6,237,852 B1 | 5/2001 | Svetal et al. | |
| 6,252,508 B1 | 6/2001 | Vega et al. | |
| 6,281,796 B1 | 8/2001 | Canipe et al. | |
| 6,296,184 B1 | 10/2001 | Dejaeger | |
| 6,299,702 B1 | 10/2001 | Herzer | |
| 6,333,692 B1 | 12/2001 | Anderson et al. | |
| 6,335,686 B1 | 1/2002 | Goff et al. | |
| 6,346,884 B1 | 2/2002 | Uozumi et al. | |
| 6,354,497 B1 | 3/2002 | Lippert et al. | |
| 6,356,197 B1 | 3/2002 | Patterson et al. | |
| 6,429,776 B1 | 8/2002 | Alicot et al. | |
| 6,476,720 B2 | 11/2002 | Andersen et al. | |
| 6,486,782 B1 | 11/2002 | Zarembro et al. | |
| 6,489,891 B1 | 12/2002 | Ho et al. | |
| 6,497,361 B1 | 12/2002 | Mason | |
| 6,499,656 B1 | 12/2002 | Marsh et al. | |
| 6,507,279 B2 | 1/2003 | Loof | |
| 6,517,000 B1 | 2/2003 | McAllister et al. | |
| 6,592,037 B1 | 7/2003 | Clancy | |
| 6,595,421 B2 | 7/2003 | Detwiler | |
| 6,681,989 B2 | 1/2004 | Bodin | |
| 6,764,010 B2 | 7/2004 | Collins, Jr. et al. | |
| 6,783,072 B2 | 8/2004 | Acosta et al. | |
| 6,788,205 B1 * | 9/2004 | Sadler et al. | 340/572.3 |
| 6,795,809 B2 | 9/2004 | O'Brien et al. | |
| 6,809,645 B1 * | 10/2004 | Mason | 340/572.1 |
| 6,854,647 B2 | 2/2005 | Collins, Jr. et al. | |
| 6,857,567 B2 | 2/2005 | Latimer et al. | |
| 6,933,848 B1 | 8/2005 | Stewart et al. | |
| 7,051,943 B2 * | 5/2006 | Leone et al. | 235/462.45 |
| 7,109,867 B2 | 9/2006 | Forster | |
| 7,132,947 B2 * | 11/2006 | Clifford et al. | 340/572.3 |
| 7,170,414 B2 * | 1/2007 | Clifford et al. | 340/572.3 |
| 7,222,086 B2 | 5/2007 | Huffman | |
| 7,232,070 B2 | 6/2007 | Craig | |
| 7,295,113 B2 | 11/2007 | Haller et al. | |
| 7,303,128 B2 * | 12/2007 | Canipe et al. | 235/462.01 |
| 7,316,351 B2 | 1/2008 | Carlson | |
| 7,389,918 B2 | 6/2008 | Wike, Jr. et al. | |
| 7,407,096 B2 | 8/2008 | Latimer et al. | |
| 7,495,564 B2 * | 2/2009 | Harold et al. | 340/572.3 |
| 7,506,803 B2 * | 3/2009 | Skaistis et al. | 235/375 |
| 7,527,198 B2 * | 5/2009 | Salim et al. | 235/385 |
| 7,575,161 B2 | 8/2009 | Nguyen et al. | |
| 7,606,632 B2 | 10/2009 | Roberts | |
| 7,619,528 B2 | 11/2009 | Kobres | |
| 7,800,490 B2 * | 9/2010 | Allen et al. | 340/522 |
| 7,868,767 B2 * | 1/2011 | Komatsu | 340/572.8 |
| 2002/0011933 A1 * | 1/2002 | Andersen et al. | 340/572.1 |
| 2002/0038267 A1 | 3/2002 | Can et al. | |
| 2002/0074402 A1 | 6/2002 | Latimer et al. | |
| 2002/0105424 A1 | 8/2002 | Alicot et al. | |
| 2002/0171548 A1 | 11/2002 | Ho et al. | |
| 2002/0178048 A1 | 11/2002 | Huffman | |
| 2002/0186133 A1 | 12/2002 | Loof | |
| 2003/0075602 A1 * | 4/2003 | Wike et al. | 235/383 |
| 2003/0135417 A1 | 7/2003 | Bodin | |
| 2003/0146278 A1 | 8/2003 | Collins, Jr. et al. | |
| 2003/0146280 A1 | 8/2003 | Acosta et al. | |
| 2003/0197611 A1 * | 10/2003 | Clifford et al. | 340/572.1 |
| 2003/0209600 A1 | 11/2003 | Collins, Jr. et al. | |
| 2003/0234288 A1 * | 12/2003 | Canipe et al. | 235/383 |
| 2004/0000591 A1 | 1/2004 | Collins, Jr. et al. | |
| 2004/0041021 A1 | 3/2004 | Nugent, Jr. | |
| 2004/0046027 A1 | 3/2004 | Leone et al. | |
| 2004/0056779 A1 | 3/2004 | Rast | |
| 2004/0094620 A1 | 5/2004 | Nguyen et al. | |
| 2004/0113791 A1 * | 6/2004 | Salim et al. | 340/572.3 |
| 2004/0155780 A1 * | 8/2004 | Rapchak | 340/573.1 |
| 2004/0195306 A1 | 10/2004 | Carlson | |
| 2004/0246104 A1 | 12/2004 | Baechtiger et al. | |
| 2005/0029350 A1 * | 2/2005 | Jusas et al. | 235/451 |
| 2005/0092834 A1 | 5/2005 | Latimer et al. | |
| 2005/0139667 A1 * | 6/2005 | Barrus et al. | 235/432 |
| 2005/0145694 A1 * | 7/2005 | Collins et al. | 235/383 |
| 2005/0219053 A1 * | 10/2005 | Clifford et al. | 340/572.4 |
| 2005/0230478 A1 * | 10/2005 | Chapman et al. | 235/462.13 |
| 2005/0274788 A1 | 12/2005 | Craig | |
| 2005/0283272 A1 | 12/2005 | Roberts | |
| 2006/0049947 A1 | 3/2006 | Forster | |
| 2006/0116899 A1 | 6/2006 | R. Lax et al. | |
| 2006/0123041 A1 | 6/2006 | Sandrini et al. | |
| 2006/0145813 A1 | 7/2006 | Haller et al. | |
| 2006/0176152 A1 | 8/2006 | Wagner et al. | |
| 2006/0208890 A1 * | 9/2006 | Ehrman et al. | 340/572.1 |
| 2006/0267730 A1 | 11/2006 | Steinke et al. | |
| 2007/0210922 A1 | 9/2007 | Clifford et al. | |
| 2008/0094218 A1 * | 4/2008 | Kobres | 340/572.3 |
| 2009/0198529 A1 * | 8/2009 | Burkholder et al. | 705/7 |
| 2009/0224923 A1 * | 9/2009 | Abraham et al. | 340/572.1 |

FOREIGN PATENT DOCUMENTS

| | | |
|---|---|---|
| EP | 0 689 175 A2 | 12/1995 |
| EP | 1 098 276 A2 | 5/2001 |
| EP | 1 335 336 A2 | 8/2003 |
| GB | 2 317 075 A | 3/1998 |
| WO | WO 98/53435 A1 | 11/1998 |
| WO | WO 00/67193 | 11/2000 |

OTHER PUBLICATIONS

Spectra-Physics VS1000 and VS1200 Scanner Level 1 Service Manual, pp. 4-31 through 4-32 (Dec. 1994).

Brochure: Magellan SL™ 360-Degree Scanner/Scale, PSC Inc. (2000).

PSC Scanning, Inc. Magellan SL Scanner and Scanner/Scale Installation and Operation Manual, pp. 1-3 through 1-6 and 2-23 through 2-26 (2001).

Brochure: Sensormatic ScanMax™/SlimPad™ Electronic Article Surveillance Deactivator, Sensormatic Electronics Corporation (1999).

Brochure: Sensormatic SlimPad™ Pro Ultra-Max™ Label Deactivator, Sensormatic Electronics Corporation (2002).

Brochure: Sensormatic ScanMax™ HS Pro Ultra-Max® Scanner-Embedded Label Deactivator, Sensormatic Electronics Corporation (2002).

Brochure: Mettler Toledo 8217AS Scanner Scale (2003) from http://www.mt.com/mt/product_detail/product.jsp?m=t&key=Y3MDg4NjM1Mj visited Aug. 28, 2003.

Installation Guide for Sensormatic Acousto-Link™ Option for Ultra-Max Deactivators, Sensormatic Electronics Corporation (2000).

Sensormatic 2001 Product Catalog, pp. 117-119, 139-145, Sensormatic Electronics Corporation (2001).

Transponder News, Aug. 14, 2003, http://www.rapidttp.com/transponder/index.html, visited Aug. 20, 2003.

Sensormatic 2002 Product Catalog, pp. 7.0-7.12; 9.0-9.3.

Brochure: Sensormatic Compact Pad Pro Ultra Max Label Deactivator (2002).

* cited by examiner

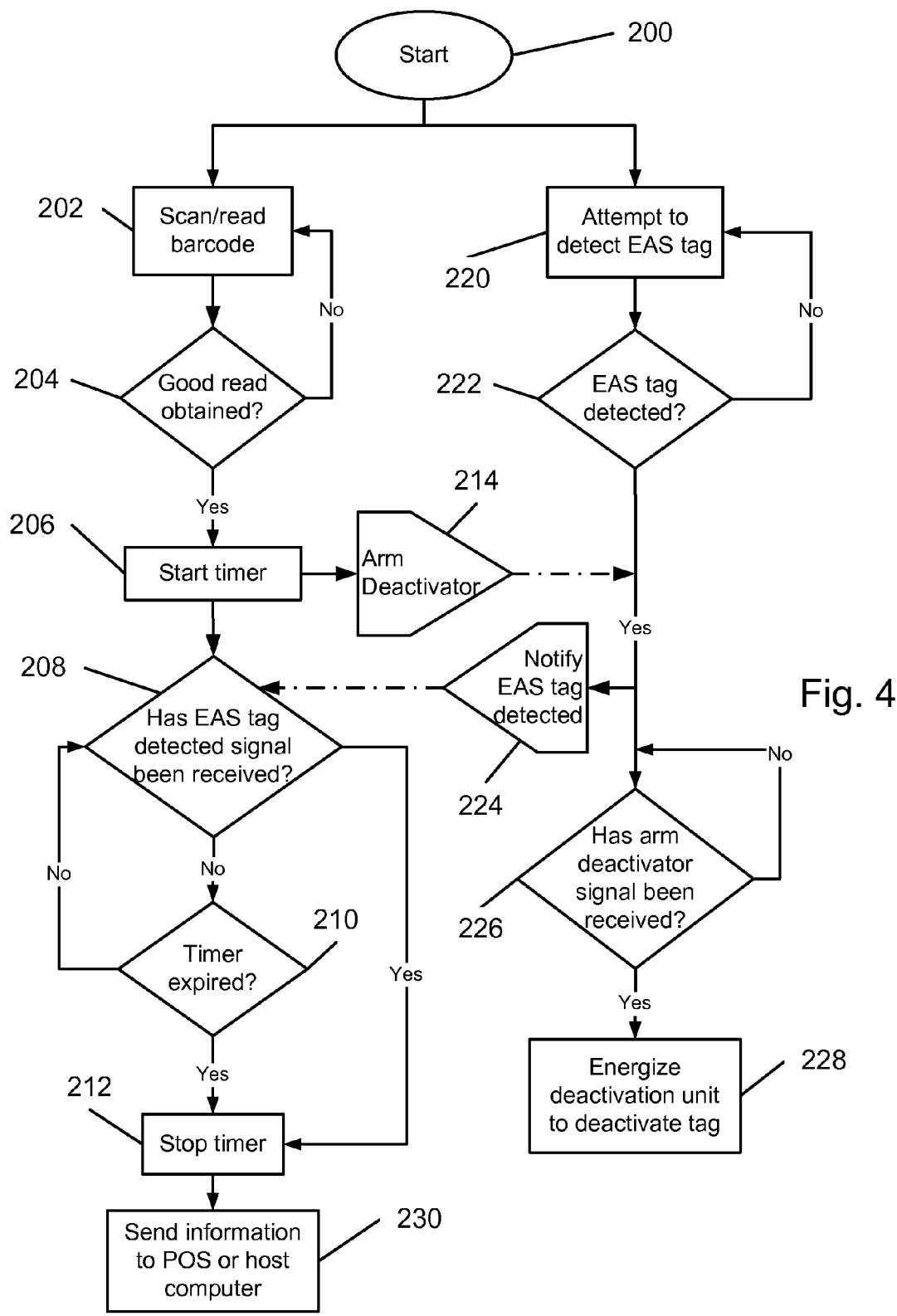

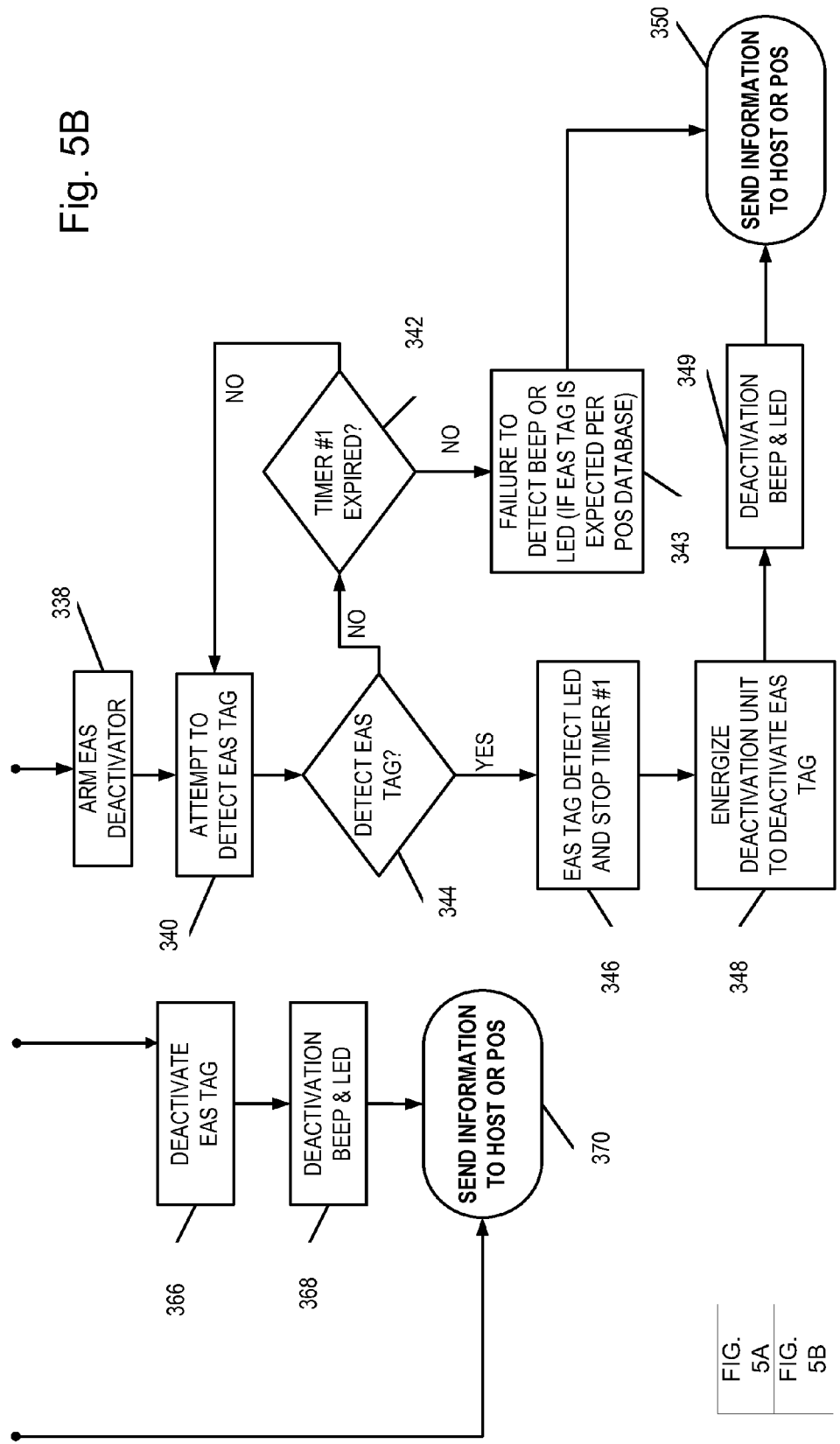

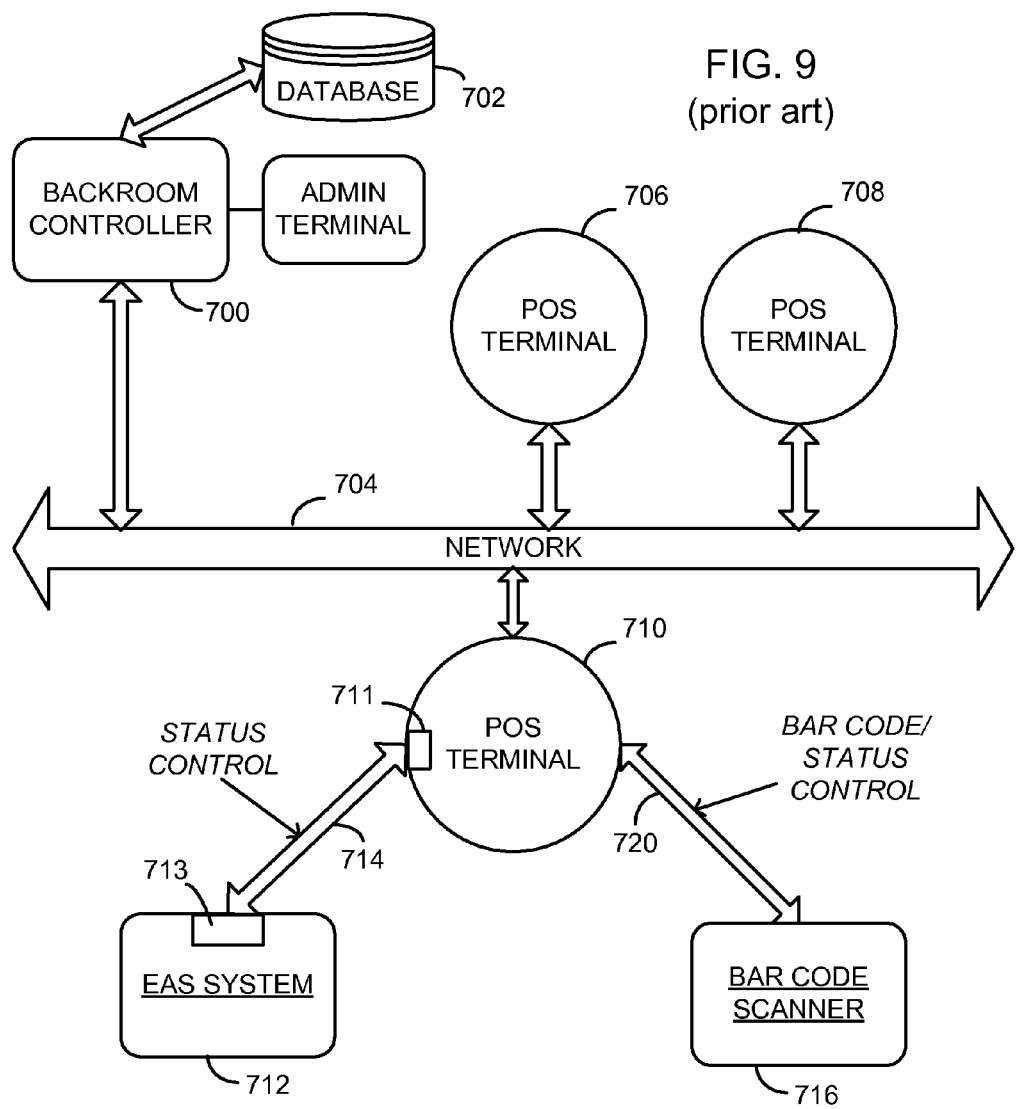
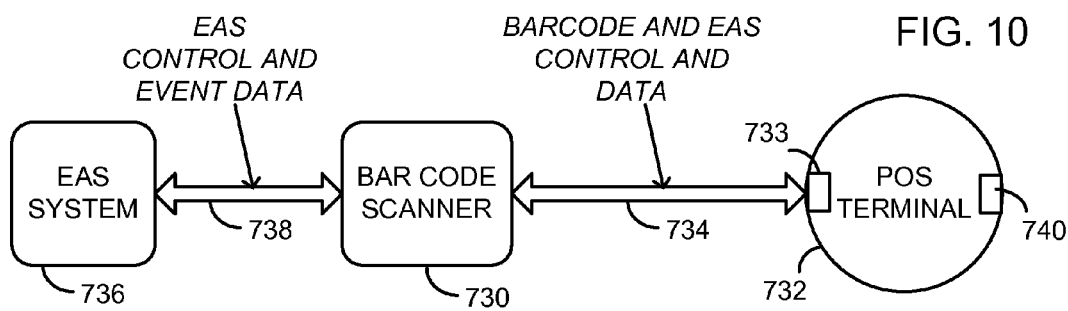

OPERATION MONITORING AND ENHANCED HOST COMMUNICATIONS IN SYSTEMS EMPLOYING ELECTRONIC ARTICLE SURVEILLANCE AND RFID TAGS

RELATED APPLICATIONS

This application is a divisional of U.S. application Ser. No. 10/612,870 filed Jul. 2, 2003 now U.S. Pat. No. 7,527,198 which is a continuation-in-part of U.S. application Ser. No. 10/390,542 filed Mar. 14, 2003, now abandoned which claims priority from U.S. Provisional Application No. 60/365,432 filed Mar. 18, 2002, each of these applications incorporated herein by this reference.

BACKGROUND

The field of the present disclosure relates to monitoring methods and techniques for systems employing electronic article surveillance (EAS) tags or radio frequency identification (RFID) tags. In particular, methods and apparatus are described herein for monitoring performance and effectiveness of EAS deactivations systems and RFID readers. In addition, improved host communications are disclosed.

Many retail checkout and inventory control systems employ RFID readers or EAS tag deactivation devices. Electronic article surveillance (EAS) systems have employed either reusable EAS tags or disposable EAS tags to detect articles for prevention of shoplifting and unauthorized removal of articles from store. Reusable EAS tags are normally removed from the articles before the customer exits the store. Disposable EAS tags are generally attached to the packaging by adhesive or are disposed inside item packaging. These tags remain with the articles and must be deactivated before they are removed from the store by the customer.

One type of EAS tag comprises a length of amorphous magnetic material which is positioned substantially parallel to a length of magnetizable material used as a control element. When an active tag, i.e., one having a magnetized control element, is placed in an alternating magnetic field that defines an interrogation zone, the tag produces a detectable tag signal. When the tag is deactivated by demagnetizing its control element, the tag no longer produces the detectable tag signal and the tag is no longer responsive to the incident energy of the EAS system so that an alarm is not triggered. Such deactivation of the tag can occur, for example, when a checkout operator in a retail establishment passes an EAS tagged article over a deactivation device located at the checkout counter thereby deactivating the tag.

Generally, deactivation devices of tags include a coil structure that may be energized to generate a magnetic field of a magnitude sufficient to render the tag "inactive." In other words, the tag is rendered no longer responsive to incident energy applied thereto to provide an output alarm or to transmit an alarm condition to an alarm unit external to the tag.

RFID technology uses electromagnetic energy as a medium through which to send information. Typically, RFID tags are affixed to various articles for allowing identification of articles in a sales transaction or tracking movement of the articles through a business location. In a typical RFID tag system, a receiver and some type of transmitter, an antenna, and memory are implemented. Through the use of these components, RFID tags are enabled to receive, store, and transmit article-identifying data to/from a remote data base station without the manual handling operations as is required in most bar code systems. RFID tags may be read-only or read-write. Passive RFID tags may be implemented without batteries and draw their power from the radio frequency (RF) energy transmitted from the reader. RFID tags may be low or high frequency depending on the application.

Deactivation of an EAS tag attached to an article is sometimes ineffective for various reasons. This failure to deactivate can result in false alarming of the EAS system which is undesirable. Performance deficiencies in deactivating an EAS tag may result from any of several causes, such as poor quality or damaged tags, improper use of the EAS deactivation equipment, improper placement of the EAS tag on the item, or degraded performance in the deactivation equipment.

If quickly detected, a failed attempt to deactivate an EAS tag may be overcome by a manual re-try; the operator presses a button to manually deactivate the tag. However, this procedure presents a security risk as a tag manually deactivated may not be the one attached to the item just scanned. Thus the present inventors have recognized that it would be advantageous to detect and capture manual deactivations for subsequent processing.

In addition, other EAS activities can provide important input to system software, for example in the host or POS, but reconfiguring the interface between the scanner and a POS terminal to communicate real-time EAS activities is complicated and costly. It would be advantageous to communicate various EAS activities to a POS terminal using existing hardware and/or software interfaces. In such cases, EAS activities can be processed by changing only application level software. Such changes enable a variety of improvements in scanner/EAS coordination to decrease failure-to-deactivate (FTD) events, reduce operator interaction and reduce theft.

Further, improved integration of EAS systems can be achieved by expanding the existing scanner/POS communication channel to include EAS system status and control commands.

RFID tags and hybrid/combination RFID/EAS tags may also experience performance deficiencies as a result of several causes, such as poor quality or damaged RFID tags, improper use of the RFID reading equipment, improper placement of the tags, or degraded performance in the reading equipment.

The present inventors have recognized the desirability of monitoring the operation and performance of EAS and RFID tags and systems and providing both statistical and performance data as to such operation and performance.

SUMMARY

The present invention is directed to data reading and accumulation systems and as well as systems and methods for monitoring operation and performance of systems employing electronic tags such as article surveillance (EAS) tags or radio frequency identification (RFID) tags. In one embodiment, an apparatus and method for monitoring and reporting electronic tag readability and operator/system performance levels includes an optical symbol reader and/or electronic tag reader/sensor/deactivator (such as an RFID reader, EAS device or combined RFID/EAS device) that measures and reports values of reading/detection/deactivation events during operation which may be indicative of electronic tag operability. The apparatus may further comprise a data accumulation device including a memory storage portion to accumulate the measurement values for each set of electronic tags, and a programmed computing system to analyze the measured values and report on the results of the analysis. The data accumulation function and report generation function are preferably integrated into a single device which is connected to a plurality of optical code readers for the purpose of monitoring the performance of the reader/detector/deactivator, the performance of the system operators, and the readability of the electronic tags.

A preferred/example method of monitoring and reporting electronic tag operability and operator and system performance levels in a combined data reader and EAS system includes the steps of reading an optical symbol, attempting to sense an EAS tag, energizing a deactivation unit if an EAS tag has been sensed, optionally validating that the EAS tag sensed has been deactivated, performing measurements and noting events during the sensing/deactivating process, accumulating these values, analyzing the accumulated data, and reporting the above. The method may list the items (as identified by their bar codes) which have EAS tags and/or which had tags having sense or deactivation problems. The method may also include reporting performance of the reading/detection/deactivation devices and device operators.

Another aspect disclosed is directed to methods for detecting and recording manual deactivation activity—a potential source of fraud or "shrinkage". The methods provide for notifying a POS or other host system of manual deactivation events.

Another aspect disclosed is directed to host notification of various EAS events. EAS event notifications preferably are sent to the POS using special, reserved barcodes as this technique can be implemented without changing the existing communication channel between the scanner and the POS or other host.

More generally, an aspect disclosed provides for "remote control" of an EAS system by the POS terminal by leveraging and expanding the POS to scanner communications channel.

BRIEF DESCRIPTION OF THE DRAWINGS

FIG. 4 is a flow chart of a method of reader and EAS controller operation according to another preferred embodiment.

FIG. 9 is a simplified block diagram of a prior art networked checkout system showing the principal channels of communication.

FIG. 10 is a simplified block diagram of an improved architecture for remote control of an EAS.

DETAILED DESCRIPTION OF THE PREFERRED EMBODIMENTS

Preferred embodiments will now be described with reference to the drawings. For the purposes of the present disclosure, most of the descriptions will be described with respect to an EAS tag sense/deactivation system which is combined with an optical reader (e.g. a barcode scanner), but the disclosure would also be applicable to other electronic tag systems such as RFID tag systems or combined EAS/RFID tag systems. The disclosure may also apply to a system such as disclosed in U.S. application Ser. No. 09/597,340 hereby incorporated by reference wherein an EAS or RFID tag circuit or enabler circuit is integrated into the circuitry of the electronic item itself.

Figure 1:
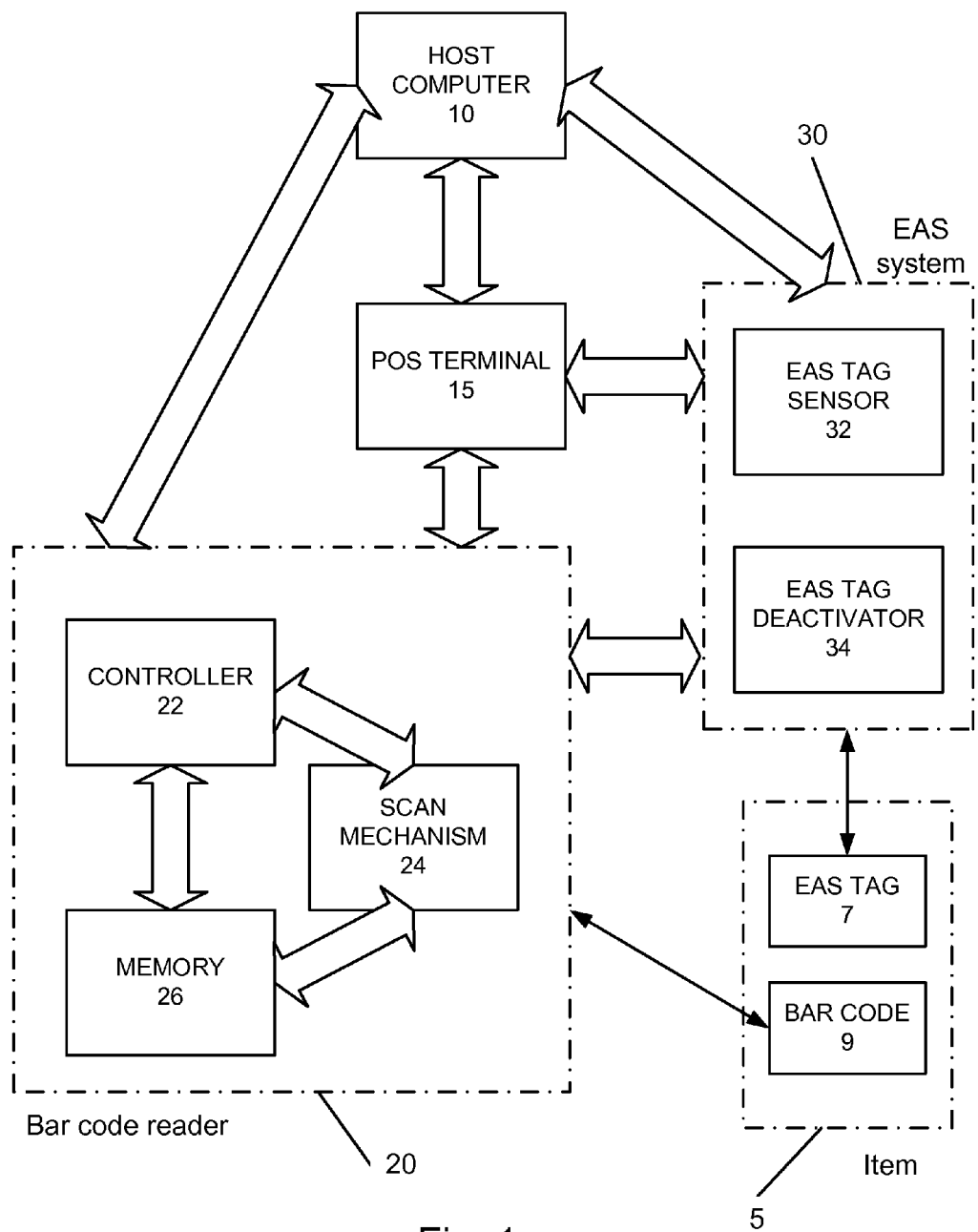
FIG. 1 is a block diagram of a combined data reader and EAS deactivation system according to a preferred embodiment.

FIG. 1 is a block diagram of a combined barcode reader 20 and EAS deactivation system 30 connected to or in communication with a point of sale (POS) terminal 15 which is in turn connected to a host computer 10. The bar code reader 20 and EAS system 30 are preferably integrated within a single housing. Various configurations for such a combination system are described in U.S. Pat. No. 5,917,412 or U.S. application Ser. No. 10/062,274 filed Feb. 1, 2002, U.S. Pat. No. 6,783,072 hereby incorporated by reference. Other suitable combined scanner and EAS systems include the Magellan® SL scanner or the Magellan® 8500 scanner manufactured by PSC Inc. of Eugene, Oreg.

In operation, an item 5 bearing a barcode label 9 and an EAS tag 7 is passed through a scan volume of the barcode reader 20. The reader 20 scans the barcode 9 via the scan mechanism 24. Preferably under control of controller 22 in the reader 20, the EAS system sensor 32 senses the EAS tag 7 on the item 5 and in response the EAS deactivator 34 energizes producing a magnetic field for deactivating the EAS tag 7. The reader 20 may then append data respecting the operation of the EAS system 30 to the bar code label data and send the combined information to the POS terminal 15 and/or the host computer. The host computer 10 then may receive or access the combined data either from the POS terminal or directly from the reader 20 and the EAS system 30. Further details for the processing of the data is discussed below.

The data (i.e. the combined barcode and EAS operation data) may be held in the memory 26 of the barcode reader to allow access by the POS or host at the desired time. For example, if the data reader 20 is a cordless portable device, it may be desirable to store the data in the memory 26 until the unit is returned to a docking station or until a command is received to perform a (wireless) download. The data reader 20 may perform some processing of the information or merely transmit it to the POS 15 or the host computer 10.

Alternately, the data reader 20 may send the barcode information to the EAS system 30, the EAS system 30 appending the EAS system operation data to the barcode data and transmit the combined information to the host 10 or POS 15. The information may also undergo certain processing in the EAS system 30.

Additionally, the system may also monitor and report data label readability and operator and data reader performance information such as described in U.S. Pat. No. 5,837,983 hereby incorporated by reference. The three types of information: (1) identification information, (2) data label readability and operator and data reader performance information, and (3) the electronic tag readability and operator/system performance information may all be combined for transmission to the host 10 or POS 15.

Since it is desirable to match EAS operation data to the item bearing the EAS tag, the data is preferably correlated to the barcode data (which identifies the item scanned). A preferred correlation method is to append the EAS operation data to the barcode data such as additional digits or fields at the end of the barcode. Alternately, the barcode data may be sent to the POS/host and the EAS data may be separately sent to the POS/host and the POS/host may correlate the EAS data to a particular barcode by making certain assumptions. For example, if EAS data received from the EAS system 30 within a given time interval of receipt of a barcode is received from the data reader, then the POS may assume that the EAS data applies to an EAS tag attached to the item corresponding to that barcode.

Figure 2:
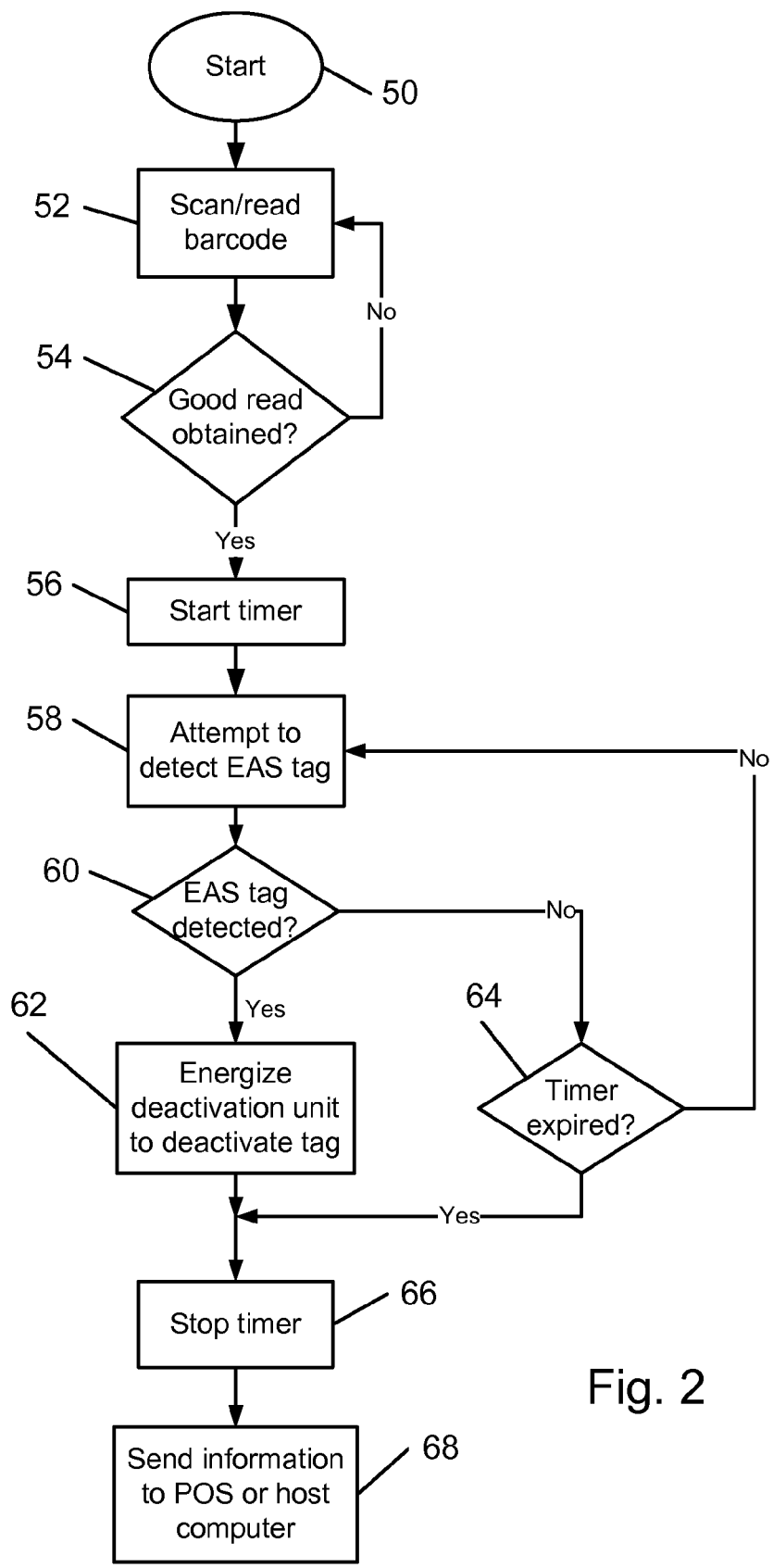
FIG. 2 is a flow chart of a method of reader and EAS controller operation according to a preferred embodiment.

FIG. 2 is a flow chart of a method according to a first embodiment as described in the following steps.

Activating the system at start step 50.
Commencing reading a barcode entering the scan volume at step 52.
Determining at step 54 whether a good read of the barcode has been obtained; if "No" continue scanning at step 52 and if "Yes" proceed to step 56.
Starting timer at step 56.
Attempting to detect an EAS tag at step 58.
Determining at step 60 whether an EAS tag has been detected within a time limit. If no tag is detected, it is queried at step 64 whether the time limit has expired: if "No" (time limit has not expired) continue detecting at step 58; if "Yes" (time limit has expired) proceeding to step 66. If an EAS tag is detected at step 60, proceed to step 62.
At step 62, energizing the deactivation unit to deactivate the tag.
Stopping the timer at step 66.
At step 68, sending the operative information to the POS or host computer.

In a first instance, the operative information collected may comprise the event of whether an EAS tag was sensed at steps 58-60 for the item scanned. The host may then obtain statistics of what percentage of a particular item had EAS tags sensed.

The information may also comprise the time it took to sense the EAS tag as measured by the timer at steps 56-66. Such information may provide some indication as to EAS tag quality, EAS tag placement effectiveness, the operational efficiency/quality of the EAS sensing/deactivation equipment or operator technique. The measurements may be applied to a particular item or class of items, or for items in general.

For example, the barcode scanner identifies an item as a "Kodak® film five pack" and appends to the bar code data whether an EAS tag was sensed for that item and if so, the time it took to sense (and presumably deactivate) the tag. The host computer may then accumulate the data over time and determine what percentage of Kodak® film five packs read by the scanner included an EAS tag. If the store intended to attach EAS tags on every pack of film, and this data showed that only 80% of film packs were detected as having EAS tags, then store management could be advised of the discrepancy.

The time to sense data may provide information as to the placement of the EAS tag, the operational efficiency/quality of the EAS detecting/deactivation equipment, or the efficiency/quality of the operating technique of the checkout clerk. The data may be analyzed as to a particular operator, a particular checkstand, or storewide basis.

Figure 3:
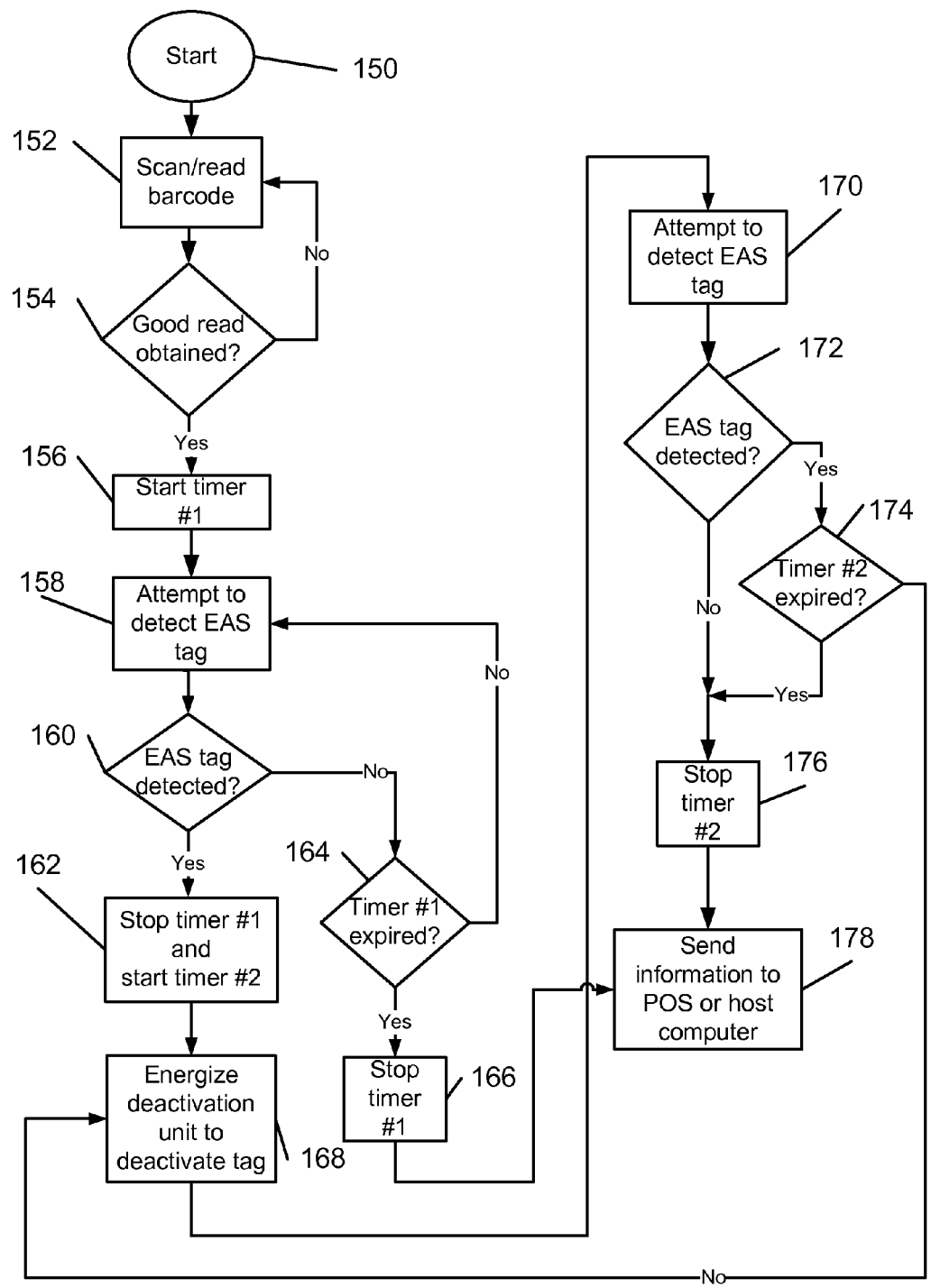
FIG. 3 is a flow chart of a method of reader and EAS controller operation according to another preferred embodiment.

FIG. 3 is a flow chart of a method according to a second embodiment as described in the following steps.

Activating the system at start step 150.
Commencing reading a barcode entering the scan volume at step 152.
Determining at step 154 whether a good read of the bar code has been obtained; if "No" continue scanning at step 152 and if "Yes" proceed to step 156.
Starting timer #1 at step 156.
Attempting to detect an EAS tag at step 158.
Determining at step 160 whether an EAS tag has been detected within a time limit. If no tag is detected, it is queried at step 164 whether the time limit has expired: if "No" (time limit has not expired) continue detecting at step 158; if "Yes" (time limit has expired) proceeding to step 166 stopping timer #1 and then proceeding to step 178. If an EAS tag is detected at step 160, proceed to step 162.
At step 162, stopping timer #1 and starting timer #2 and then proceeding to step 168.
Energizing the deactivation unit to deactivate the tag at step 168.
After deactivation unit is energized, attempting to detect the EAS tag at step 170. This step is an attempt to confirm that the tag previously sensed at step 160 has indeed been deactivated.
Determining at step 172 whether an EAS tag has been detected within a time limit. If "Yes" (a tag is detected), it is queried at step 174 whether the time limit has expired: if "No" (time #2 has not expired) returning to step 168 and attempting to deactivate the tag again; if "Yes" (timer #2 has expired) proceeding to step 176 stopping timer #2 and then proceeding to step 178. If "No" at step 172 (no EAS tag detected and thus it is presumed that the EAS tag previously is detected at step 160) proceed to step 162.
At step 162, stopping timer #2 and then proceeding to step 178.
At step 178, sending the information to the POS or host computer.

The method of FIG. 3 may provide all the advantages of the method of FIG. 2, but additionally allows for accumulating information as to confirmation of deactivation and the time (via timer #2) it took for deactivation and the number of deactivation attempts (how many step 174 to step 168 reiterations engaged). Such a system/method permits monitoring of the success rate for deactivating an EAS tag of a particular item or class of items.

In some systems, the data reader and the EAS system are not integrated or connected to the extent as presumed by the methods of FIGS. 2 and 3. FIG. 4 is a flow chart for a third embodiment where the data reader and the EAS system are not integrated but merely communicate with each other, by the following steps.

Activating the system at start step 200. Scanning and EAS detection proceed at the same time along parallel/separate paths.
the scanner path:
Commencing reading a barcode entering the scan volume at step 202.
Determining at step 204 whether a good read of the bar code has been obtained; if "No" continue scanning at step 202 and if "Yes" proceed to step 206.
Starting timer at step 206; and at step 214 sending an arming signal to the EAS system; then proceeding to step 208.
At the same time as scanning occurs, the EAS system receives the start signal and attempts to detect an EAS tag at step 220.
Determining at step 222 whether an EAS tag has been detected. If "No" (i.e. no tag is detected) continue detecting at step 220; if "Yes" (i.e. EAS tag has been detected) sending a notification signal that detection has occurred to the barcode scanner at step 224 and proceeding to step 226.

At step 226, querying if an arming signal has been received from the bar code scanner (see step 214); if "Yes" proceeding to step 228.

Energizing the deactivation unit to deactivate the tag at step 228.

Returning to the function at the barcode reader, the reader is waiting at step 208 for the EAS tag detection notification from the EAS system.

Determining at step 208 if a signal has been received from the EAS system that an EAS tag has been detected. If "Yes" proceeding to step 212; if "No" proceeding to step 210.

Determining at step 210 whether the timer (which was started at step 206) has expired. If "No" returning to step 208; if "Yes" passing to step 212.

Stopping the timer at step 212.

At step 230, sending the operative information to the POS or host computer by, for example, appending (1) event information that an EAS tag was detected for the item scanned and (2) timer information for how long it took for the EAS system to detect the tag.

Thus the barcode reader and the EAS deactivation system need not be integrated to permit the quality monitoring methods. The method of FIG. 5 described below may comprise a completely "decoupled" system in which there is minimal communication or essentially no communication between the barcode reader and the EAS system.

Figure 5A:
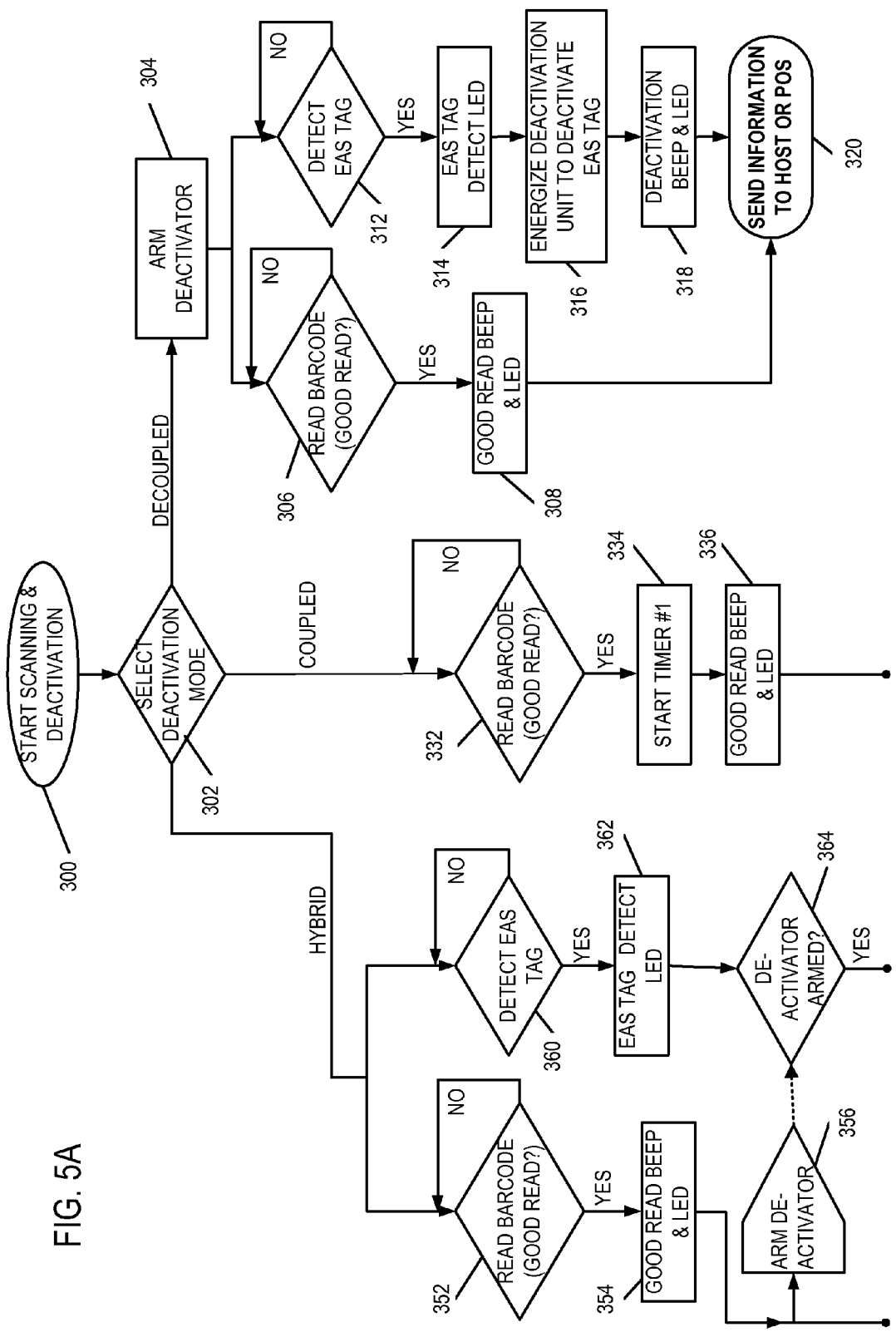
FIG. 5 (comprised of FIGS. 5A, 5B) is a flow chart of combination method of reader and EAS controller operation according to another preferred embodiment.

FIG. 5 (comprised of FIGS. 5A, 5B) is a flow chart of a preferred method capable of switching between modes of operation. The bar code reader in this embodiment is equipped with barcode label programming system whereby functions of the reader may be programmed and selected by presenting a programming label to be read by the reader or by downloading commands from the host computer. Additionally in this system/method, various functions or operating modes of the EAS system may also be programmed and selected via barcode label programming or downloading from the host.

Though the system may comprise fewer or more operating modes, the method of FIG. 5 permits the system to select between three operating modes: decoupled mode (steps 304-320), coupled mode (steps 332-350), or hybrid mode (steps 352-370). FIG. 5 is a flow chart of a preferred method as described in the following steps.

Activating the system at start step 300.

Selecting at step 302 one of a "coupled" mode of operation, a "decoupled" mode of operation, or a "hybrid" mode via a suitable selection method such as barcode label programming.

If "coupled" mode is entered:—Commence scanning a barcode entering the scan volume at step 332; if a good read is obtained ("Yes"), proceed to step 334; if a good read is not obtained ("No") then continue scanning.

Starting timer #1 at step 334.

Actuating at step 336 the "good read" indicator such as an audible tone or "beep" and/or a visible indicator such as an LED.

Arming the EAS deactivator at step 338 (FIG. 5B).

Attempting to detect an EAS tag at step 340.

Determining at step 344 whether an EAS tag has been detected within a time limit. If no tag is detected, it is queried at step 342 whether the time limit has expired: if "No" (time limit has not expired) continue detecting at steps 340, 344; if "Yes" (time limit has expired) proceeding to step 343. If an EAS tag is detected at step 344, proceed to step 346.

At step 343, timer #1 is stopped and a "fail to detect" indicator such as an audible tone or "beep" and/or a visible indicator such as an LED is actuated; then proceed to step 350.

Proceeding from step 344 that an EAS tag has been detected, stopping timer #1 at step 346 and actuating the "EAS tag detected" indicator such as an audible tone or "beep" and/or a visible indicator such as an LED.

At step 348, energizing the deactivation unit to deactivate the tag.

Actuating at step 349 the "EAS deactivation" indicator such as an audible tone or "beep" and/or a visible indicator such as an LED.

At step 350 (from step 343 or 349), sending the operative information to the POS or host computer.

In the method of steps 332-350, one or more timers may be added. For example, a timer may be added to measure various time intervals:

(1) The time between reading a barcode and arming the deactivator at steps 332-338 and successfully detecting an EAS tag at step 344—as discussed above for previous examples, this time it takes to detect the EAS tag is a measure as to EAS tag quality, EAS tag placement effectiveness, the operational efficiency or quality of the EAS detection/deactivation equipment or operator technique. The measurements may be applied to a particular item or class of items, or for items in general.

(2) The time between EAS tag detection at step 344 a verification of deactivation (which may be added between steps 348 and 349) may provide an indication as to confirmation of deactivation and the time it took for deactivation and the number of deactivation attempts (see further description with respect to the embodiment of FIG. 3). Such a system/method permits monitoring of the success rate for deactivating an EAS tag of a particular item or class of items.

Referring once again to the mode selection step 302, if "coupled" mode was entered, scanning and EAS detection proceed at the same time along parallel/separate logic paths beginning at steps 352 (scanning) and 360 (EAS detection), respectively, as follows.

Reading a barcode entering the scan volume at step 352: if a good read is obtained ("Yes"), proceed to step 354; if a good read is not obtained ("No") then continue scanning.

Actuating at step 354 the "good read" indicator such as an audible tone or "beep" and/or a visible indicator such as an LED.

Sending at step 356 an arming signal to the EAS system; then proceeding to step 370—sending the operative information to the POS or host computer.

At the same time as scanning occurs, the EAS system receives the start signal and attempts to detect an EAS tag at step 360: if "No" (i.e. no tag is detected) continue detecting; if "Yes" (i.e. EAS tag has been detected) proceeding to step 362.

Actuating at step 362 the "EAS detected" indicator such as an audible tone or "beep" and/or a visible indicator such as an LED.

At step 364, querying if a arming signal has been received from the bar code scanner (see step 356); if "Yes" proceeding to step 366.

Energizing the deactivation unit to deactivate the tag at step 366, then proceeding to step 370.

Actuating at step 368 the "EAS tag deactivated" indicator such as an audible tone or "beep" and/or a visible indicator such as an LED.

At step 370, sending the operative information to the POS or host computer by, for example, appending event information that an EAS tag was detected for the item scanned.

In the method of steps 352-370, one or more timers may be added. For example, a timer may be added to measure various time intervals:

(1) The time between detecting an EAS tag at step 360 and arming the deactivator armed at step 364. The deactivator is armed from a signal from the barcode reader that a barcode was read. Thus, this time interval may be a good indication of the time it takes for a good read. Since an EAS tag does not require the line-of-sight orientation required by optical code reading, the EAS tag may be detected as soon as the item is placed within the read/detect volume (assuming an overlap between the read volume and the detection volume). Thus the EAS detection may provide a better starting point of the time it takes to read for analyzing performance.

(2) Time between Barcode reading at step 352 and EAS tag detected at step 360. As discussed above for previous examples, this time it takes to detect the EAS tag is a measure as to EAS tag quality, EAS tag placement effectiveness, the operational efficiency or quality of the EAS detection/deactivation equipment or operator technique. The measurements may be applied to a particular item or class of items, or for items in general.

Returning to step 302, where the deactivation mode selected is "decoupled", scanning and EAS detection proceed at the same time along completely separate paths, by the following steps.

Arming the deactivator at step 304.

Reading a barcode entering the scan volume at step 306: if a good read is obtained ("Yes"), proceed to step 308; if a good read is not obtained ("No") then continue scanning.

Actuating at step 308 the "good read" indicator such as an audible tone or "beep" and/or a visible indicator such as an LED, then proceeding to step 320.

At the same time as scanning occurs, the EAS system has been already armed at step 304, and attempts to detect an EAS tag at step 312: if "No" (i.e. no tag is detected) continue detecting; if "Yes" (i.e. EAS tag has been detected) proceeding to step 314.

Actuating at step 314 the "EAS detected" indicator such as an audible tone or "beep" and/or a visible indicator such as an LED.

Energizing the deactivation unit at step 316 to deactivate the tag.

Actuating at step 318 the "EAS tag deactivated" indicator such as an audible tone or "beep" and/or a visible indicator such as an LED.

Sending at step 320 the operative information to the POS or host computer. The host computer or POS may receive separate signals, a barcode signal from the reader with the barcode information and an EAS signal from the EAS system containing information respective EAS tag detection and/or deactivation. The host or POS may associate the EAS signal to the barcode signal due to the proximity of receipt of the signals thus providing for the desired system operation feedback as in the other systems previously described.

In the method of steps 304-320, one or more timers may be added. For example, a timer may be added to measure various time intervals:

(1) The time between arming the deactivator at step 304 and successfully detecting an EAS tag at step 312—as discussed above for previous examples, this time it takes to detect the EAS tag is a measure as to EAS tag quality, EAS tag placement effectiveness, the operational efficiency or quality of the EAS detection/deactivation equipment or operator technique. The measurements may be applied to a particular item or class of items, or for items in general.

(2) The time between EAS tag detection at step 312 and good read at step 306. Since an EAS tag does not require the line-of-sight orientation required by optical code reading, the EAS tag may be detected as soon as the item is placed within the read/detect volume (assuming an overlap between the read volume and the detection volume). Thus the EAS detection may provide a better starting point of the time it takes to read for analyzing performance.

It should be appreciated that the certain of the embodiments or features of the embodiments disclosed herein may be readily combined with other of the embodiments. For example, any of the methods or features of FIGS. 2-4 may be implemented into the method of FIG. 5.

Other modifications may be implemented. For example, where the RFID transmitter/receiver or the EAS sensor/deactivator is a multi-sensor or multi-plane unit (such as disclosed in U.S. Pat. No. 5,917,412 or U.S. application Ser. No. 10/062,274 filed Feb. 1, 2002, U.S. Pat. No. 6,783,072, these patents having already been incorporated by reference), the sensing system may acquire information as to which sensor/antenna (of a multi-sensor unit) was the sensor which first detected the tag, or the order of detection as between multiple sensors, namely upstream sensor or downstream sensor; vertical sensor or horizontal sensor. Such information may provide an indication of the motion of the item as passed through the scan volume by the operator.

In another embodiment where the scanner is a multi-plane scanner such as one of the PSC Inc. Magellan® scanners, the system may also acquire information as to which window, or even which scan line, of the scanner provided the (first) successful bar code read. The RFID/EAS sensor data (i.e. in multi-sensor or multi-plane sensor systems which sensor detected the tag) may also be correlated to the scanner data (i.e. which scan line scanned the barcode, and through which window) to provide further information for analyzing system operation. For example, knowing either the window or the scan line (or both), the system may deduce the position/orientation of the item from the position/orientation of the barcode being read. Presuming that the tag is positioned proximate the barcode label, the system may provide correlation data as to position of the EAS tag during the scan-sense-deactivate process (or the position of the RFID tag during the detect/prompt/read process). For example if the barcode was read by a top down scan line from the vertical window, the system would calculate that the item was positioned with the bar code label facing upward and deduce that the EAS tag was also on the top of the item.

In another example, where the item was an item containing a material which tended to inhibit passage of magnetic waves (e.g. certain types of metal) and the EAS deactivation unit was disposed only in the lower section of the scanner housing, i.e. below the item, the operation feedback data may be able to explain why deactivation was inefficient, such as due to difficulty of the magnetic deactivation field in penetrating through the item to the EAS tag.

On the other hand, if the EAS detector or barcode scanner determined that the EAS tag was positioned in the sweet spot (i.e., the preferred tag location), then if it were determined that sensing or deactivation efficiency were poor, it may be deduced that the operational efficiency of EAS sensing/deactivation equipment or the tag itself is suspect since the item was passed through the scan volume with the tag oriented in an optimal position.

Performance of the deactivation system may also be affected by the position of the operator's hand during scanning/deactivation because the hand may cover and screen the electronic tag inhibiting deactivation. Accordingly, by gathering information of the system failing to detect or deactivate, the tag monitoring system may provide feedback as to whether the operator is properly using the system, inferring that the operator is covering the tag with his/her hand.

Location of an RFID tag on an item relative to the position of the transmitter/receiver may be more susceptible to performance degradation due to either (1) interference from the item or the operator's hand interposed between the tag and the transmitter/receiver or (2) distance from the tag to the transmitter/receiver, particularly with respect to transmission of the information from the RFID tag to the RFID receiver (due to the low power nature of the signal. Thus the monitoring of the signal transmission and/or measuring the strength of the return signal from the RFID tag to the RFID receiver may provide useful data being collected by the RFID monitoring system.

Since the EAS detector may be continuously detecting during the scanning process, the system may log (i.e. count) how many detections are made during the reading process. Such a log may also be useful in analyzing the effectiveness/performance of the EAS system or potentially the performance of the scanner.

The system may also provide feedback to the operator as to items which have been scanned and which according to the POS database should have an EAS tag. If no EAS tag is detected, an alarm or other indicator may be activated to notify the operator of the condition.

The system may provide (to the host or POS) an indication of the strength of the signal being detected. Such a strength of signal (which may for example be appended to the barcode information along with the other EAS information data) may provide a measure as to EAS tag quality, EAS tag placement effectiveness, the operational efficiency or quality of the EAS detection/deactivation equipment or operator technique. The measurements may be applied to a particular item or class of items, or for items in general.

There may also be methods to measure deactivation effectiveness. For example the Ultra-Max® EAS tag made by Sensormatic Electronics Corporation of Boca Raton, Fla. is deactivated by reducing the magnetic strength of the bias magnet or by changing its magnetization direction, which shifts the resonant frequency of the resonator outside of the detector's range. The system may be provided with a device for measuring an amount of this shift in resonant frequency. Such a system may then include this shift amount associated with the EAS tag when reporting to the POS or host thereby providing another indication of the effectiveness/performance of the EAS tag and/or the EAS deactivation system.

The overall information gathered by the monitoring system(s) described above may be accumulated with each measurement, then applying a given a weighting factor to each measurement, to generate an overall quality rating or grade.

In certain of the embodiments described above, the data reader may have been generally described as a bar code scanner, but other types of data readers may be combined with the EAS deactivation/activation system. The data reader may be for example a laser bar code scanner, an imaging reader, an RFID reader, or other type of device for reading optical codes (e.g. 1-D, 2-D, PDF-417), reading tags, or otherwise identifying items being passed through a scan/read zone such as have been suggested for identifying items based on their physical images such as for identifying produce. The readers may also comprise hybrid combination readers that read multiple types of label. Thus for purposes of this disclosure, a label is defined as any suitable device which contains data which may be obtained by the reader. Suitable labels include, but are not limited to: optical code labels or tags, electronic tags such as RFID tags, or the like.

Though the monitoring/feedback system has primarily been described with respect to an EAS tag system, the monitoring is also applicable to RFID tags. RFID tags are sensitive to proximity of the transmitter/receiver to the tag, particular the write range, the travel distance of response signal from the tag to the transmitter/receiver. The monitoring system may be provided with a means for measuring distance between the transmitter/receiver and the tag by measuring the time between the (last) inquiry signal being sent from the transmitter/receiver sent and the return signal being received back from the RFID tag. This distance measurement may provide further feedback as to operation procedure, for example, whether the operator is passing the item at too great a distance from the transmitter/receiver.

Figure 6:
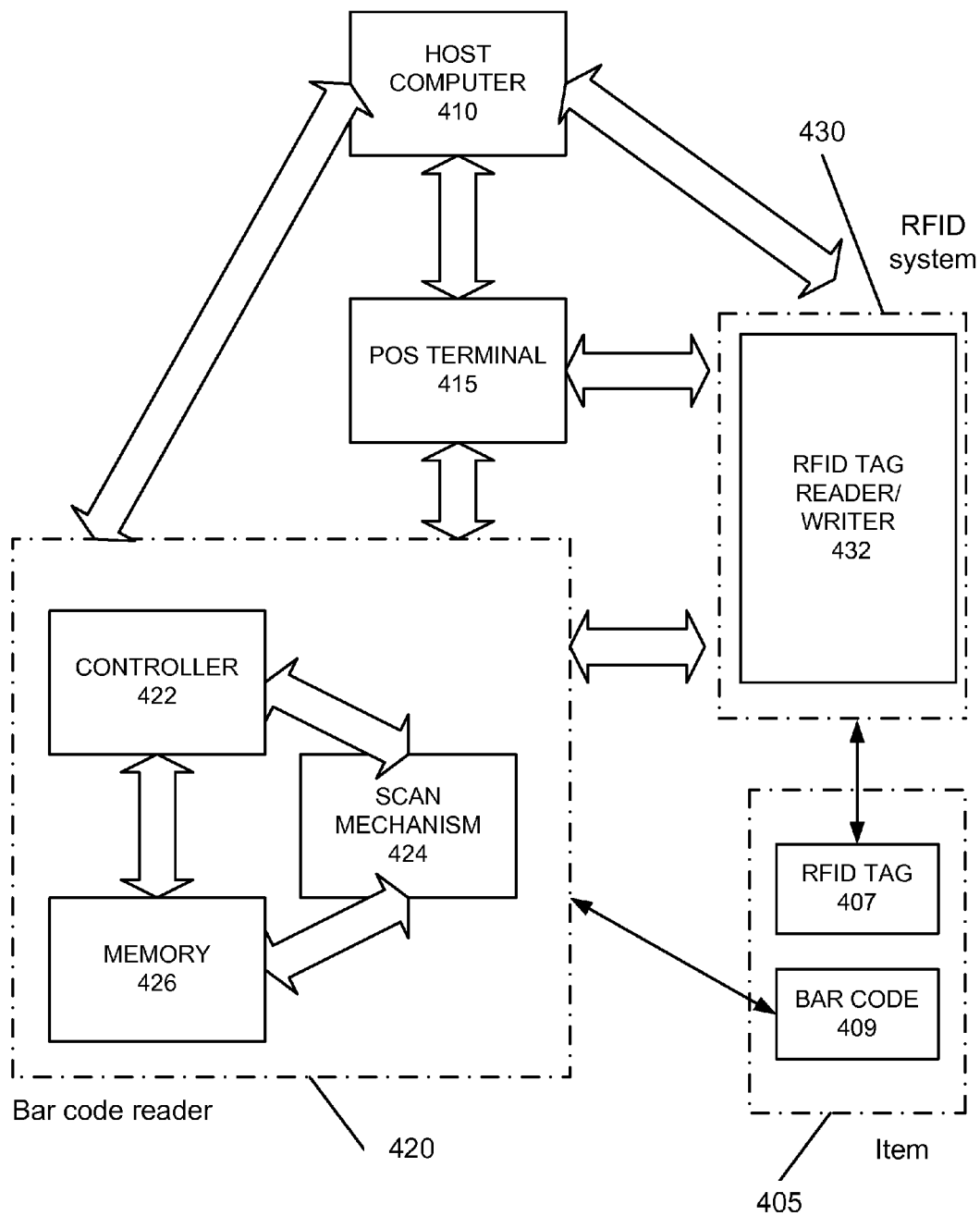
FIG. 6 is a block diagram of a combined data reader and RFID system according to an alternate embodiment.

FIG. 6 is a block diagram of a combined data reader and RFID system according to an alternate embodiment. In operation, an item 405 bearing a barcode label 409 and an RFID tag 407 is passed through a scan volume of the barcode reader 420. The reader 420 scans the barcode 409 via the scan mechanism 424. Preferably under control of controller 422 in the reader 420, the RFID system 432 reads the RFID tag 407 on the item 405 and the RFID system 432 writes to the RFID tag 407 to change the contents of the RFID tag 407. The reader 420 may then append data respecting the operation of the RFID system 430 to the barcode label data and send the combined information to the POS terminal 415 and/or the host computer 410. The host computer 410 then may receive or access the combined data either from the POS terminal or directly from the reader 420 and the RFID system 430. Further details for the processing of the data is discussed below.

The data (i.e. the combined barcode and RFID operation data) may be held in the memory 426 of the barcode reader to allow access by the POS or host at the desired time. For example, if the data reader 420 is a cordless portable device, it may be desirable to store the data in the memory 426 until the unit is returned to a docking station or until a command is received to perform a (wireless) download. The data reader 420 may perform some processing of the information or merely transmit it to the POS 415 or the host computer 410.

Alternately, the data reader 420 may send the barcode information to the RFID system 430, the RFID system 430 appending the RFID system operation data to the barcode data and transmit the combined information to the host 410 or POS 15. The information may also undergo certain processing in the RFID system 430.

Since it is desirable to match RFID operation data to the item bearing the RFID tag, the data is preferably correlated to the barcode data (which identifies the item scanned). A preferred correlation method is to append the RFID operation data to the barcode data such as additional digits or fields at the end of the barcode. Alternately, the barcode data may be sent to the POS/host and the RFID data may be separately sent to the POS/host and the POS/host may correlate the RFID data to a particular barcode by making certain assumptions. For example, if RFID data received from the RFID system 430 within a given time interval of receipt of a barcode is received from the data reader, then the POS may assume that the RFID data applies to an RFID tag attached to the item corresponding to that barcode.

In yet another alternative, a single electronic label, such as an RFID tag, may provide both identification data function and electronic security function. The monitoring system would then monitor both information data readability and operator and data reader performance information, and the electronic tag readability and operator/system performance information.

System Architecture

FIG. 9 is a simplified diagram of a prior art networked POS system. In the system of FIG. 9, a plurality of POS terminals (there may be many) are represented by POS terminals 706 and 708. Each POS terminal typically includes or interfaces to a corresponding operator display, keypad, printer, etc. (not shown). In this architecture the POS terminals all connect via network 704 to a backroom controller 700, typically deployed on a network server computer. The backroom controller 700 can be arranged to communicate with a remote, centralized server (not shown) for enterprise-wide data communications. The backroom controller 700 manages or can at least access data stored on a database or databases 702 (which may be located on the network server computer or on a data server, local or remote, as is known). Typical data stored on such a database can include product information, barcodes, pricing information, etc. Details of such databases are well known in the prior art.

As illustrated in FIG. 9, a barcode scanner 716 is coupled to a POS 710 (its host) via a communication channel 720. The POS can send control signals, such as "enable scanner" via the channel 720, and the scanner transmits scanned barcode data over the same channel. In operation, POS application software executing on a POS terminal, say 710, can access the database 702 via the backroom controller 700 to determine the price of a product associated with a barcode read by scanner 716.

FIG. 9 also shows an EAS system 712 coupled to POS terminal 710 via a second channel 714. The EAS system was described earlier; it generally comprises an EAS tag detector and an EAS tag deactivator. In this architecture, the EAS system 712 implements an interface 713 to the communications channel 714 for interaction with the POS terminal 710. In turn, the POS includes hardware and software to implement a compatible interface 711 to channel 714 for status and control signaling. One aspect of the present invention obviates the POS/EAS interface by implementing EAS "remote control" in the scanner as further described below.

Barcode Scanner to EAS Coupling Modes

Barcode scanners can be integrated to an EAS system with various degrees of coupling of EAS operations to barcode scanning operations. The desired mode of operation may be programmable, and preferably is programmable by presenting a programming (barcode) label as described above with reference to FIG. 5. For example, in the relatively simple "decoupled mode," the EAS system is continually activated (typically by assertion of both a dedicated detect enable signal, e.g., EAS_DETECT_EN, and a deactivation enable signal, e.g., EAS_DEACT_EN). The scanner software monitors the state of the EAS system by transmitting periodic status requests over an I/O channel. When an EAS tag is detected, the EAS system asserts a corresponding signal line (e.g., EAS_LBL_DETECT). In response, the scanner can assert a visual and/or audible cue. For example, in one embodiment, an EAS indicator lamp is turned red to indicate the label detected state, and turned green when the label detect signal is inactive. Or, an audible beep or tone can be generated to signify that an EAS tag is detected, but this signal should be quite different from a signal that signifies a successful barcode read.

In a "hybrid mode," the EAS system is again activated by assertion of its enable signals, but only when the scanner is enabled. (The scanner may be enabled by the POS or other host.) The scanner software again monitors the state of the EAS system by transmitting periodic status requests over an I/O channel (such as communication channel 714 in FIG. 9). Additionally, a tag deactivation cue, visual and/or audible, is asserted upon receipt of an indication from the EAS system that an EAS tag was deactivated.

Coupled Mode, Manual and Automatic Deactivation

In a more closely integrated system, effecting a "coupled mode" of operation, the EAS tag detect function is always enabled (EAS_DETECT_EN). In this mode, two types of deactivation can occur: manual and automatic. Manual deactivation occurs when the operator (e.g., a cashier) actuates a switch provided for that purpose ("EAS Exception" or "Manual Deactivate" or the like). Manual deactivation can be enabled, configured or qualified under software control. Essentially, it enables or "activates" the EAS deactivation function for a predetermined (preferably configurable) period of time.

The improved system architecture is illustrated in FIG. 10. FIG. 10 shows an EAS system 736 coupled to a bar code scanner 730 via communications channel 738 for communication of EAS control, status and event data. The scanner 730 in turn is coupled to a POS terminal 732 via communications channel 734 for communication of barcode and EAS control, status and data signals. POS 732 may be a standalone system, or it can include an interface 740 for communication with other systems or a backroom controller. This system leverages the existing hardware/software interface 733 while expanding functionality of the channel 734, so that various improvements and enhancements further described below, including host notification of selected events such as manual deactivation attempts, can be implemented at the POS application level.

Figure 7A:
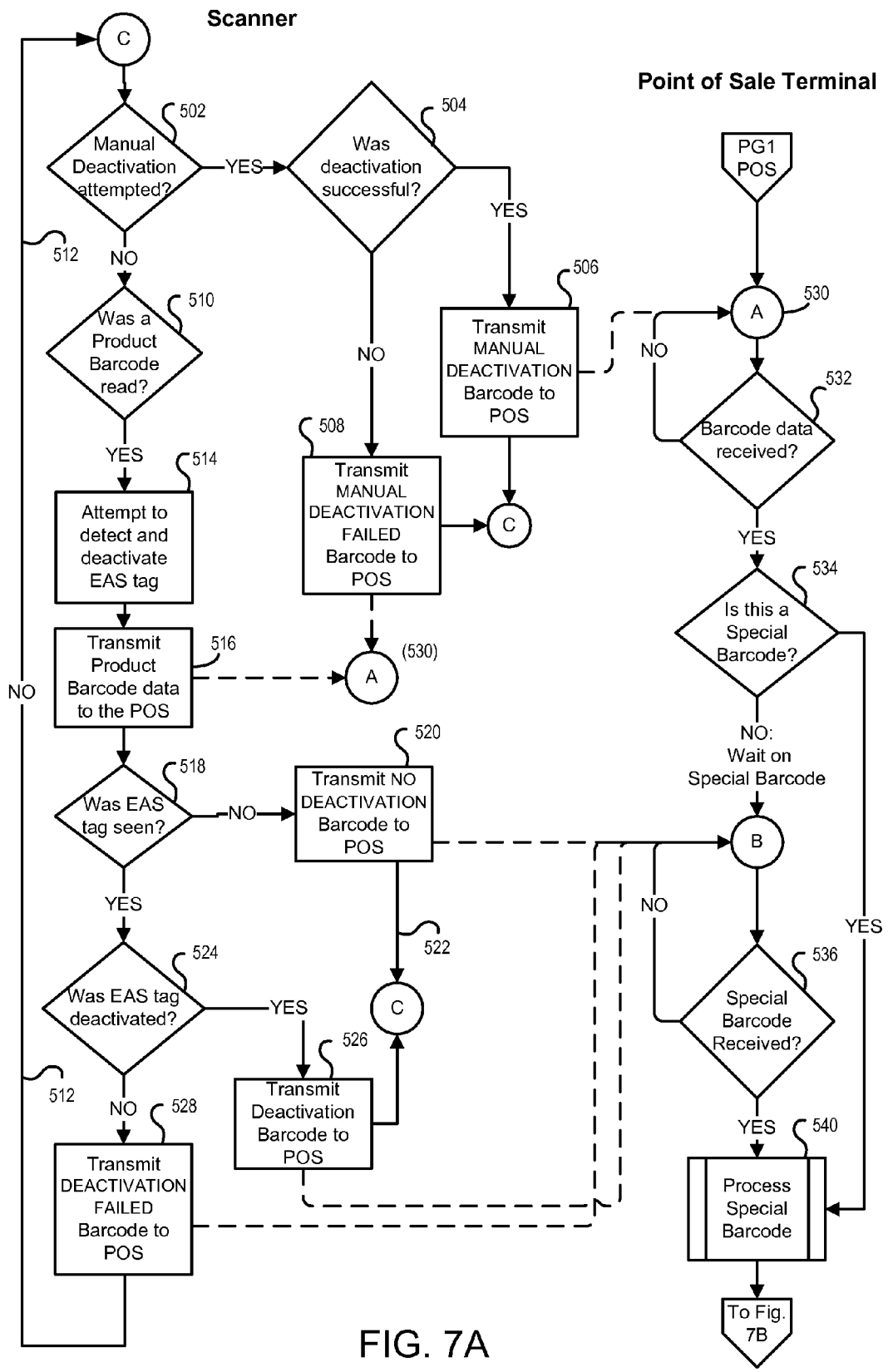
FIG. 7 (comprised of FIGS. 7A, 7B) is a flow chart of a method of monitoring EAS activity in association with scanner activity and notifying a host or POS terminal of status and events using special barcodes.

Referring now to FIG. 7A, a flowchart illustrating operation of the scanner software in a presently-preferred embodiment begins in the upper left at node "C." The software first detects whether a manual deactivation has been attempted (502). If so, it determines whether or not the deactivation attempt was successful (504). This can be done by attempting to re-sense the EAS tag, as the presence of a deactivated tag is not detected. If the deactivation attempt was successful, the software transmits a manual deactivation barcode to the POS (506). The software then loops back to node "C" and continues monitoring to detect a manual deactivation attempt in step 502.

If manual deactivation was not attempted, as determined in step 502, the software determines whether a product barcode was read (510). If so, it attempts to detect and deactivate an EAS tag (514). Next, the system transmits the product barcode data to the POS (516). This transmission is indicated in the flowchart by a dashed arrow pointing to node "A" (530) discussed below. Continuing from step 516, if an EAS tag was not detected (518), then the system transmits a "no deactivation" barcode to POS (520). It then proceeds via path 522 back to node "C" to repeat the loop. Conversely, if an EAS tag was detected (518), the system determines whether or not an EAS tag was deactivated (524). If so, the system transmits a "deactivation" barcode to POS (526) and again loops back via node "C." If an EAS tag was not deactivated (524), the system transmits a "deactivation failed" barcode to POS (528) and loops back via path 512 to node "C."

On the right side of FIG. 7A is a portion of the flowchart that reflects operations executed in the POS software in a presently-preferred embodiment. The POS code segment begins at node 530 and checks for receipt of barcode data (532). It simply loops back to 530 and waits for receipt of barcode data, as it is typically received over an asynchronous communication channel.

If and when barcode data is received, the system determines whether or not it is a "special barcode" (534). By the term "special barcode" we mean a barcode that is not used to identify a product. The system can implement a list of such special barcodes for easy recognition. If the barcode data received is not one of a predetermined list of special barcodes, it is processed in the usual fashion as a product barcode. In loop 536 the software waits for or watches for receipt of a special barcode. If and when a special barcode is received (534 or 536), the software proceeds to process the special barcode (540).

Figure 7B:
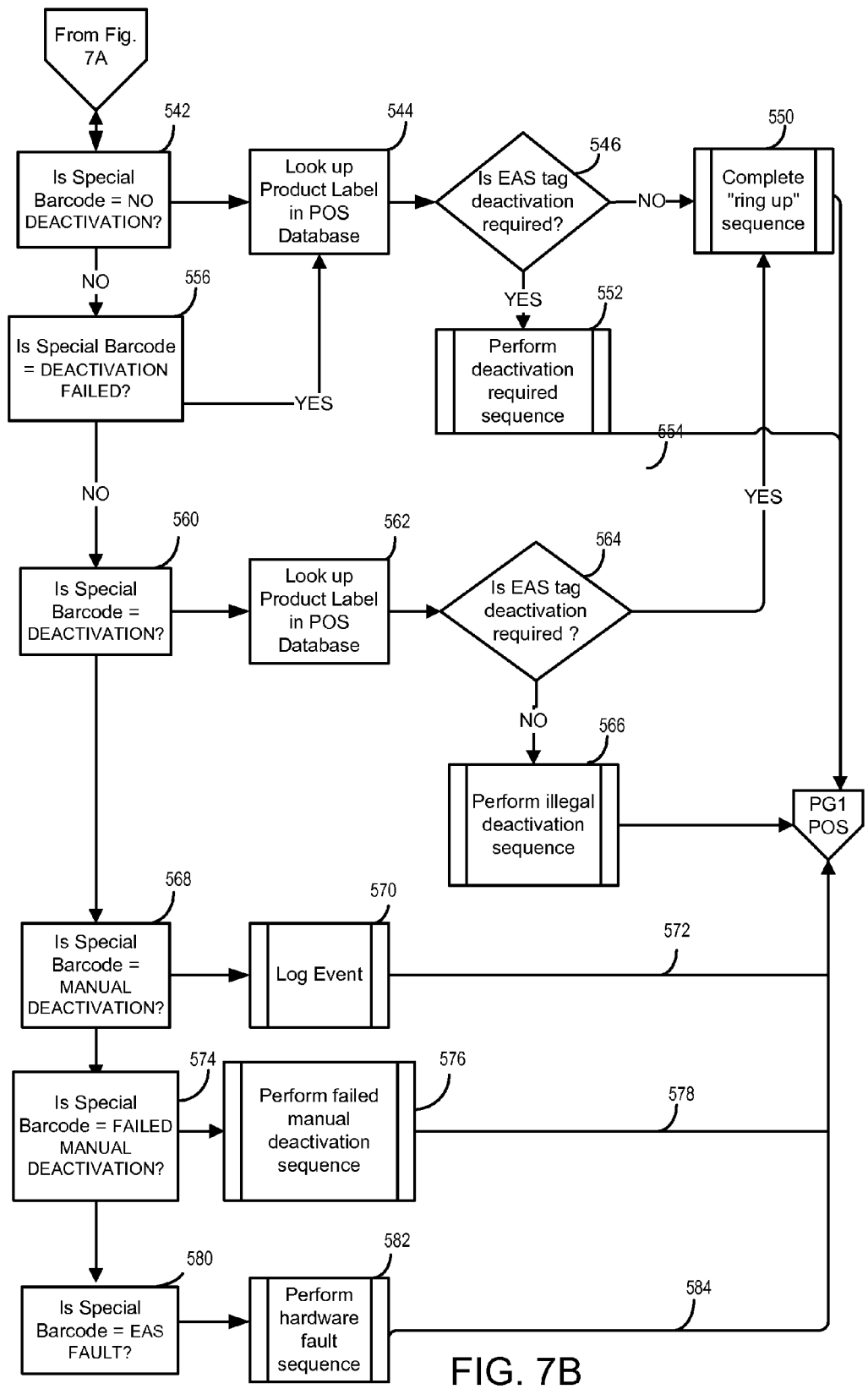

Processing of the special barcode is illustrated and by way of example in the flowchart of FIG. 7B, beginning at step 542. The software determined whether or not the special barcode indicates "no deactivation" (542). This would be the special barcode transmitted by the scanner software at step 520 in FIG. 7A indicating that a product barcode was read (and the product barcode data transmitted to the POS 516) but not EAS tag was detected (in step 518). It may be that the scanned product does not have an EAS tag, or the tag was faulty, or the EAS system failed. The system proceeds to look up the product label in a database (544), and it thereby determines whether or not EAS tag deactivation is required for the corresponding product (546). If EAS tag deactivation is not required for the corresponding product, the system proceeds to complete the "ring-up" sequence (550). Conversely, if it is determined in step 546 that deactivation is required, the software initiates the deactivation required sequence (552). This sequence can involve, for example, prompting the cashier to rescan the item, or prompting the cashier to manually deactivate, or transmitting a command to the EAS system essentially emulating manual deactivation. Thereafter, the software loops back via path 554 to watch for new barcode data. The system is not necessarily ignoring receipt of new barcode data during this process; it can be configured for multitasking or other accommodations made so that no data is overlooked.

Referring again to step 542 in FIG. 7B, if the special barcode is not recognized as indicating "no deactivation," the system determines whether or not the special barcode indicates "deactivation failed" (556). Such a barcode would be transmitted at step 528 of FIG. 7A, indicating essentially that a product barcode was read, and an EAS tag was seen, but the attempt to deactivate the tag failed. In this case, software again performs a lookup of the product label and a database (544) to determine whether EAS tag deactivation is required (546), and then proceeds accordingly as described above.

Continuing with the process of decoding the special barcode, the software checks whether the special barcode indicates "deactivation" (560). The "deactivation" event is transmitted at step 526 in FIG. 7A, essentially indicating that a product barcode was read, and that an EAS tag was detected and deactivated. Continuing in FIG. 7B, the system conducts a lookup of the corresponding product label in a database (562), to determine whether an EAS tag deactivation is required for the corresponding product (564). It should be noted that decoding the special barcode need not be carried out in the order shown in FIG. 7B, nor need it be carried out sequentially. Other techniques, some more efficient, are known. This flowchart is merely intended to describe the nature of the process generally.

Referring again to step 564, if it is determined that EAS tag deactivation is not required for the corresponding product, the system performs an illegal deactivation sequence 566 and then loops back to 530 in FIG. 7A. The illegal deactivation sequence is activated (566), because the logic has determined that a deactivation occurred where such was not required for the product just scanned. This suggests that a product other than the last one scanned bears an EAS tag that has now been deactivated. The illegal deactivation sequence can comprise various actions such as activating an alarm, logging the event, or sending a message to a management server.

If the special barcode is recognized as an indication of "manual deactivation" (568) the event is logged (570) and the system loops back via path 572 to monitor for receipt of new barcode data. If the special barcode is recognized as an indication of "failed manual deactivation" (574), the system performs a predetermined failed manual deactivation sequence (576) and loops back via path 578 to node 530 in FIG. 7A. Finally, if the special barcode is recognized as indicating "EAS fault" (580) the system performs a predetermined hardware fault sequence (582) and then loops back as above via path 584. The hardware fault sequence can comprise a variety of actions. For example, it may call for shutting down the POS because the EAS system has failed. A variety of special barcodes can be implemented to identify the nature of the hardware fault more specifically. For example, A code could be provided that indicates a failure in the power supply of the EAS system. The POS system could then prompt the operator to replace the power supply in the EAS system or to order a replacement module.

To summarize the methodology illustrated by FIG. 7, a manual deactivation attempt is detected, and a message indicating that such occurred, and whether or not it succeeded, is transmitted to the POS. In a preferred embodiment, a predetermined special barcode is sent to the POS to indicate the manual deactivation (successful), or a different barcode is sent to indicate a manual deactivation attempt failed. Alternatively, a single barcode could be designated to record every manual deactivation attempt, regardless of the outcome. In general, the concept is that selected activity or events in the EAS are detected by the scanner software and transmitted to the POS. Preferably, EAS event notifications are sent to the POS using barcodes as this technique can be implemented without changing the existing communication channel between the scanner and the POS or other host; it is already designed for communication of barcode data. The following table illustrates some examples of the use of special barcodes as described above.

| Label | Event | Flowchart FIG. 7 |
|---|---|---|
| Label 1 e.g., 12 digits | Bar code was read, and EAS tag sensed and deactivated | 526, 560 |
| Label 2 | Bar code was read, and EAS tag sensed but not deactivated | 528, 556 |
| Label 3 | Bar code was read, and EAS tag not sensed and not deactivated | 520, 542 |
| Label 4 | EAS exception button was pressed, and EAS tag sensed and deactivated | 506, 568 |
| Label 5 | EAS exception button was pressed, and EAS tag sensed but not deactivated | 508, 574 |

The specific label numbers shown in the table simply as "Label 1, Label 2" etc. are arbitrary, except that they should be selected so as to avoid product codes (UPC) or other label numbers such as industrial codes that may be encountered in the same application for other purposes. A checkout system vendor can reserve a block of label numbers so that they will not be used for products. The special status and control bar codes are transmitted along with the standard item barcodes being scanned. The POS software thus can correlate EAS activity with item bar codes as further explained below and direct the cashier accordingly. Full POS level integration can be realized when the POS uses its item database (local or backroom controller) with its EAS correlation logic. This concept was illustrated in the examples of FIG. 7B; for example, see lookup steps 544, 562.

Remote Control of the EAS System

Figure 8A:
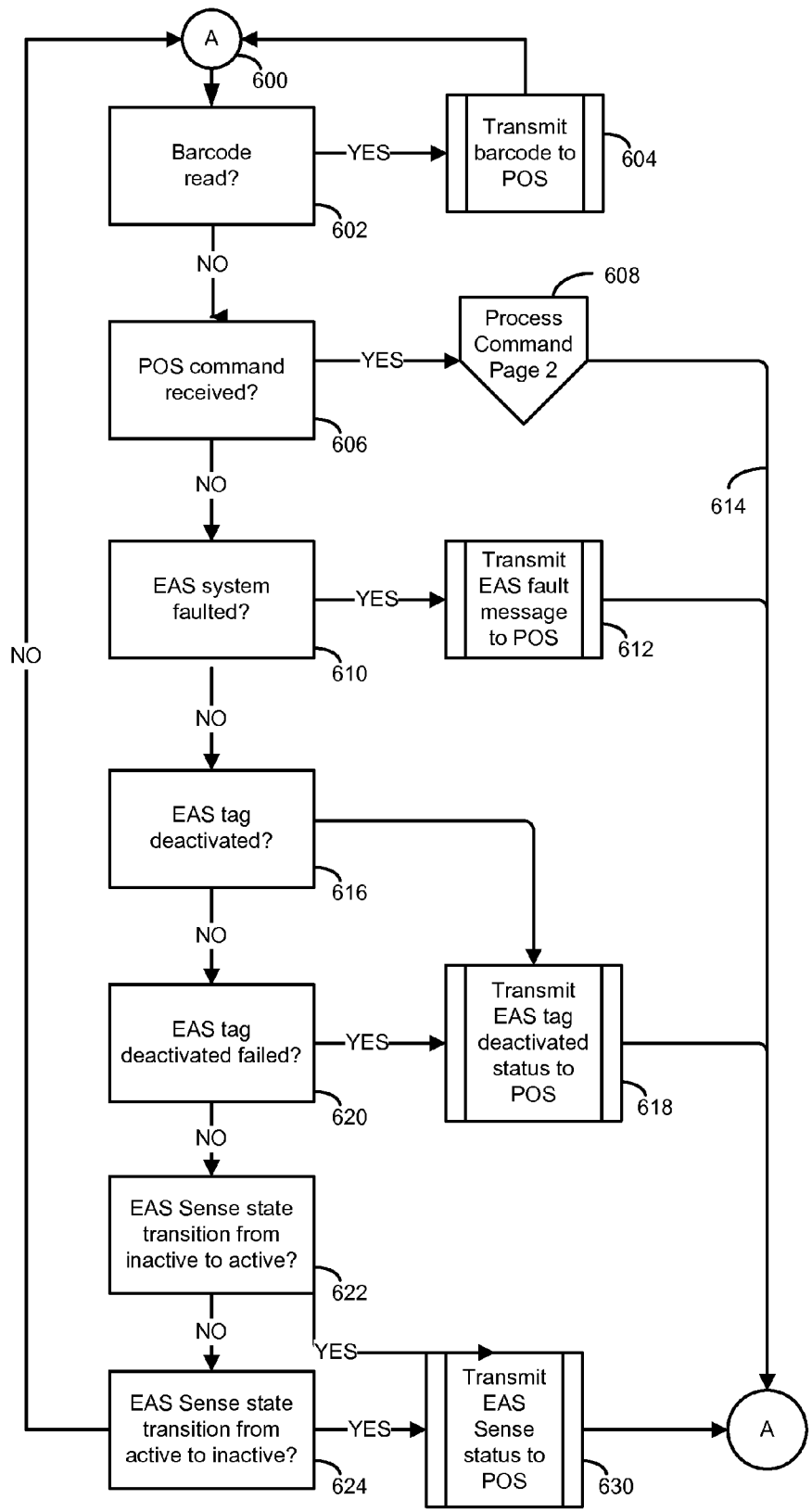
FIG. 8 (comprised of FIGS. 8A, 8B) is a flow chart illustrating one implementation of EAS command and control operations in scanner software coupled for communication with a POS terminal or host.
Figure 8B:
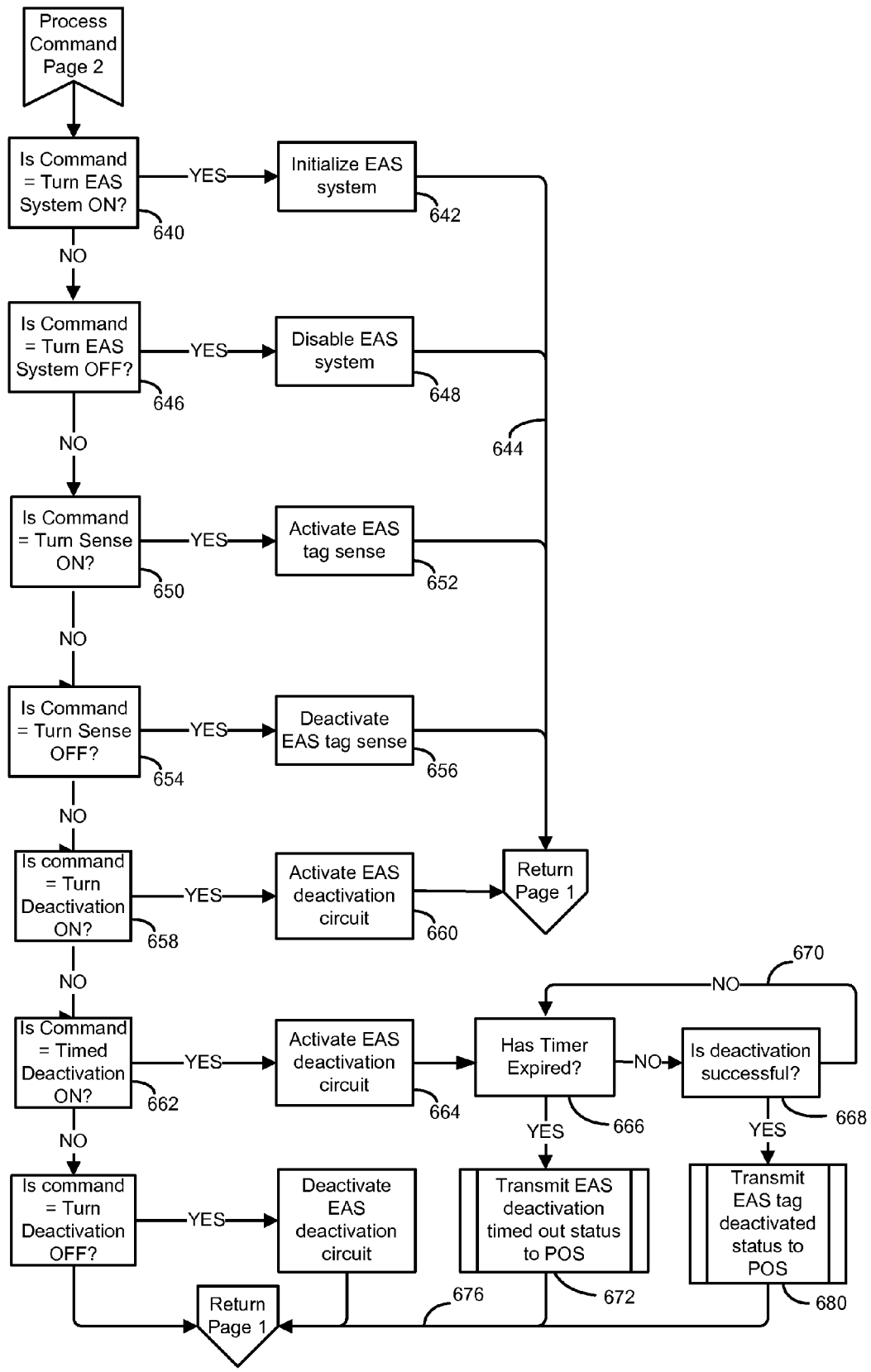

The improved system architecture and method supports "remote control" of the EAS system, meaning relatively fine-grained control of the EAS by the POS or other host. One aspect of remote control of the EAS is accomplished in a preferred embodiment by providing EAS activity feedback to the POS through the methodology described with reference to FIG. 7; i.e., employing special barcodes that do not match product barcodes in the backroom database. Another aspect of remote control is directed to status and control signaling, as distinguished from activity or event signaling. Accordingly, the POS communication channel (to the scanner) may be expanded to include EAS system status and control commands. This approach again minimizes additional hardware and software required at the POS for meaningful integration of the EAS system. Representative features are illustrated in the flowcharts of FIG. 8 as follows:

FIG. 8A illustrates scanner software for remote control of an integrated EAS system. Beginning at node "A" (600), if a barcode is read (602), the scanned barcode data is transmitted to the POS (604) as is conventional. If the incoming data does not reflect a barcode read, the system tests for a POS command (606). If a POS command is received, that command is processed (608) as illustrated in FIG. 8B, described below. After processing the POS command, control returns via path (614) to node (600). If the system detects an EAS system fault (600), it transmits an EAS fault message to the POS (612) and again loops via 614 to continue monitoring. Next, the system checks for an EAS tag deactivated (616). If so, it transmits an "EAS tag deactivated" status to the POS (618) and returns via 614. If it is determined that an EAS tag deactivation failed (620), the corresponding "EAS tag deactivation failed" status is sent to the POS (618). All of these messages can be sent by various means, but in a presently preferred embodiment, they are transmitted to the POS using predetermined special barcodes, taking advantage of the fact that the existing POS interface is designed for handling barcode data.

Continuing with reference to FIG. 8A, the next decision is to detect an EAS sense state transition from inactive to active (622). In other words, it is determined whether the EAS reported activation of the EAS tag sensor subsystem. If so, the system transmits a corresponding "EAS sense status" message to the POS (630) and again loops to node "A". Conversely, if the system detects an EAS sense state transition from active to inactive (624), it again sends the corresponding EAS sense status information to the POS (630) and loops back to "A" to continue monitoring the EAS and barcode read status. It should be noted that the various decisions illustrated in the flow chart of FIG. 8A, for example 606, 610 and 616, are shown in arbitrary order. The sequence of testing for these various indicia is not critical. In fact, the tests need not be carried out seriatim as illustrated. Similar functionality can be implemented in various ways using polling techniques, interrupts, decoders and such.

Referring again to decision (606), testing for receipt of a POS command, it was noted that the POS command is processed as illustrated in the flow chart of FIG. 8B. Referring now to FIG. 8B, the first decision (640) is whether the command is to turn the EAS system on. If so, the scanner software initializes the EAS system (642). The software then returns via path 644 to FIG. 8A. Next is the test for a command to turn the EAS system off (646). If such command is detected, the system disables the EAS system (648) and again returns via path (644). The next test (650) is to determine whether the detected command is to turn sensing on, i.e., to enable the EAS system to sense EAS tags. If so, the scanner software activates the EAS tag sensing (652), and once again returns via path 644. As indicated earlier, the EAS interface may include a discrete enable signal line for this purpose. The EAS control commands preferably are transmitted from the scanner, as in FIG. 10, rather than from the POS directly, as in FIG. 9.

Continuing with reference to FIG. 8B, the scanner system continues processing a received POS command with a test for command to turn sense off (654). In that case, the software deactivates (disables) the EAS tag sensing (656) and again returns via path 644. The next test 658 is to recognize a command to turn tag deactivation on. If so, the scanner activates the EAS deactivation circuit (660) and returns. If the command is to turn on timed deactivation (662), the system activates the EAS deactivation circuit (664) and then tests whether the associated timer has expired (666). As long as the timer has not expired, the software tests whether the deactivation was successful (668) and if not, loops back via 670 to monitor for expiration of the timer (666). When the timer expires, the software transmits the "EAS deactivation timed out" status to the POS (672) and then returns via loop (676) to monitor for new commands (FIG. 8A). If the pending tag deactivation succeeds before the timer expires (668), the software transmits a "EAS tag deactivated" status to the POS (680) and returns via loop (676).

Thus the present invention has been set forth in the form of its preferred embodiments. It is nevertheless intended that modifications to the disclosed scanning systems may be made by those skilled in the art without altering the essential inventive concepts set forth herein.

What is claimed is:

1. A method of monitoring electronic tag operation comprising the steps of passing an item through a read volume;

identifying the item by reading a label on the item with a data reader device and thereby obtaining identification data;

determining whether the item includes an Electronic Article Surveillance (EAS) tag by attempting to sense an EAS tag using an EAS sense and deactivation system;

if an EAS tag has been sensed, (a) attempting to deactivate the EAS tag and (b) validating whether the EAS tag has been deactivated by attempting to re-sense the EAS tag after attempting to deactivate;

if the EAS tag has been re-sensed, repeating steps (a) and (b) for up to a given period or a given number of cycles;

assembling operation data of the EAS system pertaining to sensing and attempting to deactivate the EAS tag, the EAS system operation data including the number of deactivation attempts having been attempted on the item;

correlating the EAS system operation data, including the number of deactivation attempts, to the item identified, sending both the EAS system operation data and the item identification data to a host.

2. A method according to claim 1,
wherein the step of correlating comprises sending the identification data to a host and separately sending the EAS system operation data to the host.

3. A method according to claim 1 wherein the step of assembling data comprises recording number of deactivation attempts made for the item.

4. A method according to claim 1 wherein the step of assembling data comprises recording an event of unsuccessful deactivation of the EAS tag.

5. A method according to claim 1 wherein the step of assembling data comprises identifying a defective EAS tag.

6. A method according to claim 5 further comprising tallying number of defective EAS tags by type of item identified.

7. A method according to claim 1 wherein the step of assembling data comprises determining EAS tag quality.

8. A method of monitoring electronic tag operation comprising the steps of
passing an item through a read volume;
identifying the item by reading a label on the item with a data reader device and thereby obtaining identification data;
determining whether the item includes an EAS tag by attempting to sense an EAS tag using an EAS sense and deactivation system;
if an EAS tag has been sensed, (a) attempting to deactivate the EAS tag and (b) validating whether the EAS tag has been deactivated by attempting to re-sense the EAS tag after attempting to deactivate;
if the EAS tag has been re-sensed, repeating steps (a) and (b) for up to a given period or a given number of cycles;
assembling operation data of the EAS system pertaining to sensing and attempting to deactivate the EAS tag;
correlating the EAS system operation data to the item identified,
wherein the step of correlating comprises:
appending the EAS system operation data to the identification data to generate a combined data string; and
transmitting the EAS system operation data and the identification data as a combined data string to a host.

9. A method according to claim 8 wherein EAS system operation data being assembled and correlated includes the number of deactivation attempts having been attempted on the item.

10. A method of monitoring electronic tag operation comprising the steps of
passing an item through a read volume;
identifying the item by reading a label on the item with a data reader device and thereby obtaining identification data;
determining whether the item includes an EAS tag by attempting to sense an EAS tag using an EAS sense and deactivation system;
if an EAS tag has been sensed, (a) attempting to deactivate the EAS tag and (b) validating whether the EAS tag has been deactivated by attempting to re-sense the EAS tag after attempting to deactivate;
if the EAS tag has been re-sensed, repeating steps (a) and (b) for up to a given period or a given number of cycles;
assembling operation data of the EAS system pertaining to sensing and attempting to deactivate the EAS tag;
correlating the EAS system operation data to the item identified,
wherein the step of correlating further comprises:
sending the identification data to a host and separately sending the EAS system operation data to the host, and
automatically matching the EAS system operation data to the identification data if the EAS system operation data is received by the host within a predetermined time period of receiving the identification data.

11. A method according to claim 10 wherein EAS system operation data being assembled and correlated includes the number of deactivation attempts having been attempted on the item.

12. A method of monitoring electronic tag operation comprising the steps of
passing an item through a read volume;
identifying the item by reading a label on the item with a data reader device and thereby obtaining identification data;
determining whether the item includes an EAS tag by attempting to sense an EAS tag using an EAS sense and deactivation system;
if an EAS tag has been sensed, (a) attempting to deactivate the EAS tag and (b) validating whether the EAS tag has been deactivated by attempting to re-sense the EAS tag after attempting to deactivate;
if the EAS tag has been re-sensed, repeating steps (a) and (b) for up to a given period or a given number of cycles;
assembling operation data of the EAS system pertaining to sensing and attempting to deactivate the EAS tag, the EAS system operation data including the number of deactivation attempts;
correlating the EAS system operation data, including the number of deactivation attempts, to the item identified,
wherein the step of assembling data further comprises measuring a time it takes to sense the EAS tag after successfully reading the label.

13. A method according to claim 12 wherein EAS system operation data being assembled and correlated includes the number of deactivation attempts having been attempted on the item.

14. A method of operating a data reading and electronic article security (EAS) system, comprising the steps of:
(a) obtaining item identification data by reading, with a data reader device, a label on an item being passed through a read volume of the data reader device;
(b) attempting to sense an EAS tag on the item;
(c) if an EAS tag has been sensed, attempting to deactivate the EAS tag;
(d) collecting EAS system operation data including the number of deactivation attempts with respect to the results of steps (b) and (c);
(e) correlating the collected EAS system operation data to the item, the collected EAS system operation data including the number of deactivation attempts having been attempted on the item;
(f) determining a success rate for deactivating an EAS tag on a particular item or class of items, based on results from steps (a)-(e).

15. A method of operating a data reading and electronic article security (EAS) system, comprising the steps of:
(a) obtaining item identification data by reading a label on an item being passed through a read volume of a data reader device;
(b) attempting to sense an EAS tag on the item;
(c) if an EAS tag has been sensed, attempting to deactivate the EAS tag;
(d) collecting EAS system operation data including the number of deactivation attempts with respect to the results of steps (b) and (c); and (e) correlating the EAS system operation data collected including the number of deactivation attempts collected to the item identified,
wherein the step of correlating comprises:
appending the collected EAS system operation data to the item identification data to form combined data; and
transmitting the combined data to a host.

16. A method according to claim 15 further comprising
(f) storing the combined data in the data reader device.

17. A method according to claim 15 further comprising
repeating steps (a) through (e) for subsequent items and storing the combined data for each of the items in the data reader device;
transmitting the combined data for items to a host for further processing.

18. A method of operating a data reading and electronic article security (EAS) system, comprising the steps of:
 (a) obtaining item identification data by reading, with a data reader device, a label on an item being passed through a read volume of the data reader device;
 (b) attempting to sense an EAS tag on the item;
 (c) if an EAS tag has been sensed, attempting to deactivate the EAS tag;
 (d) collecting EAS system operation data with respect to the results of steps (b) and (c); and
 (e) correlating the EAS system operation data collected to the item identified,
wherein the step of correlating further comprises:
transmitting the item identification data to a host and separately transmitting the EAS system operation data to the host; and
automatically matching the EAS system operation data to the item identification data if the EAS system operation data is received by the host within a predetermined time period of receiving the item identification data.

19. A method according to claim 18 wherein the step of correlating further comprises matching the EAS system operation data to the identification data if the EAS system operation data is received by the host within time period of receiving the identification data.

20. A method of operating a data reading and electronic article security (EAS) system, comprising the steps of:
 (a) obtaining item identification data by reading, with a data reader device, a label on an item being passed through a read volume of the data reader;
 (b) attempting to sense an EAS tag on the item;
 (c) if an EAS tag has been sensed, attempting to deactivate the EAS tag;
 (d) collecting EAS system operation data with respect to the results of steps (b) and (c), wherein the step of collecting data comprises measuring a time it takes to sense the EAS tag after reading the label; and
matching the EAS system operation data to the item identification data if the EAS system operation data is received by the host within a predetermined time as measured.

21. An apparatus for monitoring and reporting electronic article surveillance (EAS) tag readability in a combined data reader and electronic article security (EAS) system, comprising
a data reader for reading a label on an item being passed through a read volume;
means for measuring values of multiple EAS tag detections and/or of multiple deactivations during operation over multiple transactions for providing indication of EAS tag operability, wherein the values being measured are selected from the group consisting of: (a) the time it took to detect an EAS tag on a particular item or class of items, (b) the time it took to deactivate an EAS tag on a particular item or class of items, (c) success rate for deactivating an EAS tag on a particular item or class of items, and (d) the percentage of a particular item or class of items detected to include an EAS tag, wherein the means for measuring is operable to measure all of the values from the group.

22. An apparatus according to claim 21 further comprising
data accumulation means including a memory storage portion for accumulating measured values for EAS tags on a particular item or class of items; and
computing means for analyzing the measured values and reporting the measured values.

23. An apparatus according to claim 21 wherein the data accumulation means comprises a single device connected to a plurality of data readers for monitoring system performance and readability of the EAS tags.

24. A system for monitoring electronic article surveillance (EAS) tag quality comprising:
a combined system of a data reader and an EAS system for reading labels appended to an item and for sensing and deactivating EAS tags appended to the item;
means within the combined system for identifying a defective EAS tag comprising means for identifying EAS tags that have been sensed but not deactivated as defective tags;
means for indicating presence of the defective EAS tag;
means for correlating the number of deactivation attempts to item information of the item;
means within the combined system for tallying a number of defective EAS tags by type of item identified.

25. A system according to claim 24 further comprising
memory within the combined system for storing the number of defective EAS tags by type of item identified;
a point-of-service terminal coupled to the combined system having access to information stored in the memory.

26. A system according to claim 24 wherein the means for indicating presence comprises notifying operator.

* * * * *